(12) United States Patent
Yang et al.

(10) Patent No.: US 9,913,268 B2
(45) Date of Patent: Mar. 6, 2018

(54) SIGNAL TRANSMISSION METHOD FOR COVERAGE IMPROVEMENT AND APPARATUS FOR SAME

(71) Applicant: LG ELECTRONICS INC, Seoul (KR)

(72) Inventors: Suckchel Yang, Seoul (KR); Joonkui Ahn, Seoul (KR); Yunjung Yi, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 114 days.

(21) Appl. No.: 14/889,098

(22) PCT Filed: May 16, 2014

(86) PCT No.: PCT/KR2014/004418
§ 371 (c)(1),
(2) Date: Nov. 4, 2015

(87) PCT Pub. No.: WO2014/185748
PCT Pub. Date: Nov. 20, 2014

(65) Prior Publication Data
US 2016/0128011 A1    May 5, 2016

Related U.S. Application Data

(60) Provisional application No. 61/939,288, filed on Feb. 13, 2014, provisional application No. 61/936,896, (Continued)

(51) Int. Cl.
*H04L 1/00* (2006.01)
*H04W 72/04* (2009.01)
(Continued)

(52) U.S. Cl.
CPC ....... *H04W 72/042* (2013.01); *H04L 27/2627* (2013.01); *H04W 4/005* (2013.01);
(Continued)

(58) Field of Classification Search
CPC .. H04B 7/2121; H04B 7/2123; H04B 7/2615; H04B 1/7073; H04B 1/7087;
(Continued)

(56) References Cited

U.S. PATENT DOCUMENTS

2012/0300732 A1   11/2012   Ode et al.
2013/0083753 A1   4/2013   Lee et al.
(Continued)

FOREIGN PATENT DOCUMENTS

CN   101877865 A   11/2010
CN   102291744 A   12/2011
(Continued)

OTHER PUBLICATIONS

MediaTek Inc., "Coverage Analysis of PBCH and System Information Transmission for MTC UEs", R1-131179, 3GPP TSG-RAN WG1 #72bis, Chicago, USA, Apr. 14-Apr. 19, 2013.
(Continued)

*Primary Examiner* — Dady Chery
(74) *Attorney, Agent, or Firm* — Dentons US LLP

(57) ABSTRACT

The present invention relates to a wireless communication system. In detail, the present invention relates to a method and apparatus for acquiring system information by a terminal in a wireless communication system, the method comprising the steps of: acquiring time and frequency synchronization from a synchronization channel; performing PBCH detection in a wireless frame on the basis of the time and frequency synchronization; and acquiring the system information from the PBCH, wherein, when the terminal is a non-MTC terminal, the PBCH detection is performed by a singular sub frame in the wireless frame, and when the terminal is an MTC terminal, the PBCH detection is performed by a plurality of sub frames in the wireless frame.

8 Claims, 13 Drawing Sheets

Related U.S. Application Data filed on Feb. 7, 2014, provisional application No. 61/902,811, filed on Nov. 12, 2013, provisional application No. 61/900,319, filed on Nov. 5, 2013, provisional application No. 61/897,198, filed on Oct. 29, 2013, provisional application No. 61/886,682, filed on Oct. 4, 2013, provisional application No. 61/883,988, filed on Sep. 27, 2013, provisional application No. 61/866,556, filed on Aug. 16, 2013, provisional application No. 61/863,410, filed on Aug. 7, 2013, provisional application No. 61/862,525, filed on Aug. 6, 2013, provisional application No. 61/861,974, filed on Aug. 3, 2013, provisional application No. 61/823,927, filed on May 16, 2013.

(51) Int. Cl.
*H04W 56/00* (2009.01)
*H04W 48/16* (2009.01)
*H04L 27/26* (2006.01)
*H04W 4/00* (2018.01)
*H04W 72/00* (2009.01)

(52) U.S. Cl.
CPC ....... *H04W 48/16* (2013.01); *H04W 56/0015* (2013.01); *H04W 72/005* (2013.01)

(58) Field of Classification Search
CPC .............. H04B 1/7156; H04B 1/7183; H04B 2201/7073; H04J 2203/0069; H04J 4/00; H04Q 2213/394; H04W 72/04; H04W 72/12; H04W 76/00; H04L 5/26
USPC .................. 370/329, 330, 341, 350, 503
See application file for complete search history.

(56) References Cited

U.S. PATENT DOCUMENTS

| | | | |
|---|---|---|---|
| 2013/0272215 A1* | 10/2013 | Khoryaev | H04W 28/02 370/329 |
| 2014/0071957 A1* | 3/2014 | Xu | H04W 52/0219 370/336 |
| 2015/0131579 A1 | 5/2015 | Li et al. | |
| 2015/0181560 A1* | 6/2015 | Jamadagni | H04B 7/2621 370/329 |
| 2015/0249941 A1* | 9/2015 | Wang | H04W 36/06 370/329 |
| 2016/0057708 A1 | 2/2016 | Siomina et al. | |
| 2016/0197690 A1 | 7/2016 | Li et al. | |

FOREIGN PATENT DOCUMENTS

| | | |
|---|---|---|
| CN | 102804657 A | 11/2012 |
| EP | 2592889 A2 | 5/2013 |
| EP | 2706687 A2 | 3/2014 |
| EP | 2765724 A2 | 8/2014 |
| KR | 1020100137357 A | 12/2010 |
| KR | 10-2012-0041932 A | 5/2012 |
| KR | 1020120051635 A | 5/2012 |
| KR | 1020120089254 A | 8/2012 |
| KR | 10-2013-0040699 A | 4/2013 |
| WO | 2009/020178 A1 | 11/2010 |
| WO | 2012150836 A2 | 11/2012 |
| WO | 2013022244 A2 | 2/2013 |
| WO | 2013055078 A2 | 4/2013 |
| WO | 2013058502 A1 | 4/2013 |

OTHER PUBLICATIONS

Huawei, "Text Proposal for PBCH Coverage Improvement for MTC", R1-131819, 3GPP TSG RAN WG1 Meeting #72b, Chicago, USA, Apr. 15-19, 2013.

* cited by examiner

P : CRS for antrnna port p (p∈0, p∈0,1 or p∈0,1,2,3)

* PBCH detection is performed in single subframe in radio frame in case of non-MTC UE and in multiple subframes in radio frame in case of MTC UE.

SIGNAL TRANSMISSION METHOD FOR COVERAGE IMPROVEMENT AND APPARATUS FOR SAME

This application is a 35 U.S.C. § 371 National Stage Entry of International Application No. PCT/KR2014/004418 filed May 16, 2014, which claims benefit of and priority to U.S. Provisional Application No. 61/823,927 filed May 16, 2013, U.S. Provisional Application No. 61/861,974 filed Aug. 3, 2013, U.S. Provisional Application No. 61/862,525 filed Aug. 6, 2013, U.S. Provisional Application No. 61/863,410 Aug. 7, 2013, U.S. Provisional Application No. 61/866,556 filed Aug. 16, 2013, U.S. Provisional Application No. 61/883,988 filed Sep. 27, 2013, U.S. Provisional Application No. 61/886,682 filed Oct. 4, 2013, U.S. Provisional Application No. 61/897,198 filed Oct. 29, 2013, U.S. Provisional Application No. 61/900,319 filed Nov. 5, 2013, U.S. Provisional Application No. 61/902,811 filed Nov. 12, 2013, U.S. Provisional Application No. 61/936,896 filed Feb. 7, 2014 and U.S. Provisional Application No. 61/939,288 filed Feb. 13, 2014, all of which are incorporated by reference for all purposes as if fully set forth herein.

TECHNICAL FIELD

The present invention relates to a method for improving coverage in a wireless communication system and an apparatus for the same and, more particularly, to a signal transmission method for improving machine type communication (MTC) coverage, a signaling method and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system. In a wireless communication system, a terminal can receive information through downlink (DL) and transmit information through uplink (UL). Information transmitted or received by the terminal includes data and various types of control information and various physical channels are present according to the type and purpose of information transmitted or received by the terminal.

DISCLOSURE

Technical Problem

An object of the present invention is to provide a method for improving coverage in a wireless communication system and an apparatus for the same. Specifically, an object of the present invention is to provide a signal transmission method for improving MTC coverage, signaling method and an apparatus for the same.

It will be appreciated by persons skilled in the art that that the effects that could be achieved with the present invention are not limited to what has been particularly described hereinabove and other advantages of the present invention will be more clearly understood from the following detailed description.

Technical Solution

According to one aspect of the present invention, a method for acquiring system information by a UE in a wireless communication system includes: acquiring time and frequency synchronization from a synchronization channel; performing PBCH detection in a radio frame on the basis of the time and frequency synchronization; and acquiring the system information from the PBCH, wherein PBCH detection is performed in a single subframe in the radio frame when the UE is a non-MTC (Machine Type Communication) UE and PBCH detection is performed in a plurality of subframes in the radio frame when the UE is an MTC UE.

According to another aspect of the present invention, a UE used in a wireless communication system includes: a radio frequency (RF) unit; and a processor, wherein the processor is configured to acquire time and frequency synchronization from a synchronization channel, to perform PBCH detection in a radio frame on the basis of the time and frequency synchronization and to acquire the system information from the PBCH, wherein PBCH detection is performed in a single subframe in the radio frame when the UE is a non-MTC (Machine Type Communication) UE and PBCH detection is performed in a plurality of subframes in the radio frame when the UE is an MTC UE.

PBCH detection may be performed in subframe #0 in the radio frame when the UE is a non-MTC UE, and PBCH detection may be performed in subframes #0 and #5 in the radio frame when the UE is an MTC UE.

PBCH detection may be performed in [subframe #0, OFDMA symbols #7, #8, #9 and #10] in the radio frame when the UE is a non-MTC UE, and PBCH detection may be performed in [subframe #0, OFDMA symbols #7, #8, #9 and #10] and [subframe #5, OFDM symbols #3, #7, #8 and #12] in the radio frame when the UE is an MTC UE.

PBCH detection may be performed in [subframe #0, OFDMA symbols #7, #8, #9 and #10] in the radio frame when the UE is a non-MTC UE, and PBCH detection may be performed in [subframe #0, OFDMA symbols #3, #4, #11 and #12] and [subframe #5, OFDM symbols #3, #4, #11 and #12] in the radio frame when the UE is an MTC UE.

Advantageous Effects

According to embodiments of the present invention, it is possible to efficiently enhance coverage in a wireless communication system. Specifically, it is possible to efficiently provide a signal transmission method for improving MTC coverage, a signaling method and an apparatus for the same.

It will be appreciated by persons skilled in the art that that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

While the present invention is described on the basis of LTE-A, the concept or proposed methods and embodiments thereof of the present invention can be applied to other systems (e.g. IEEE 802.16m systems) using multiple carriers without limitation.

Figure 1:
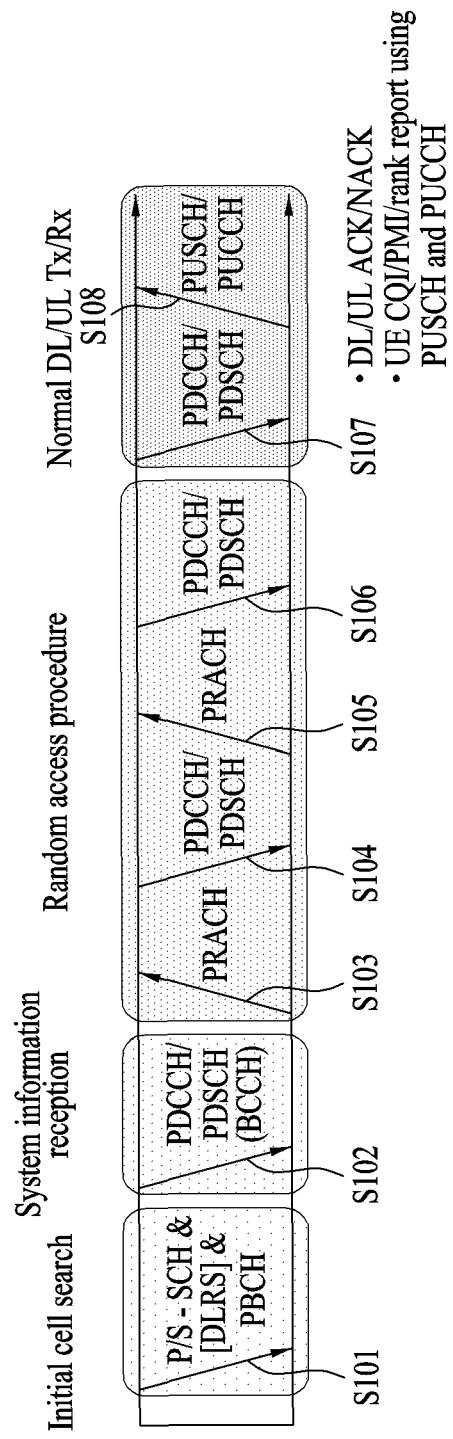
FIG. 1 illustrates physical channels used in LTE-(A) and a signal transmission method using the same.

FIG. 1 illustrates physical channels used in LTE(-A) and a signal transmission method using the same.

Referring to FIG. 1, when powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure.

Figure 2:
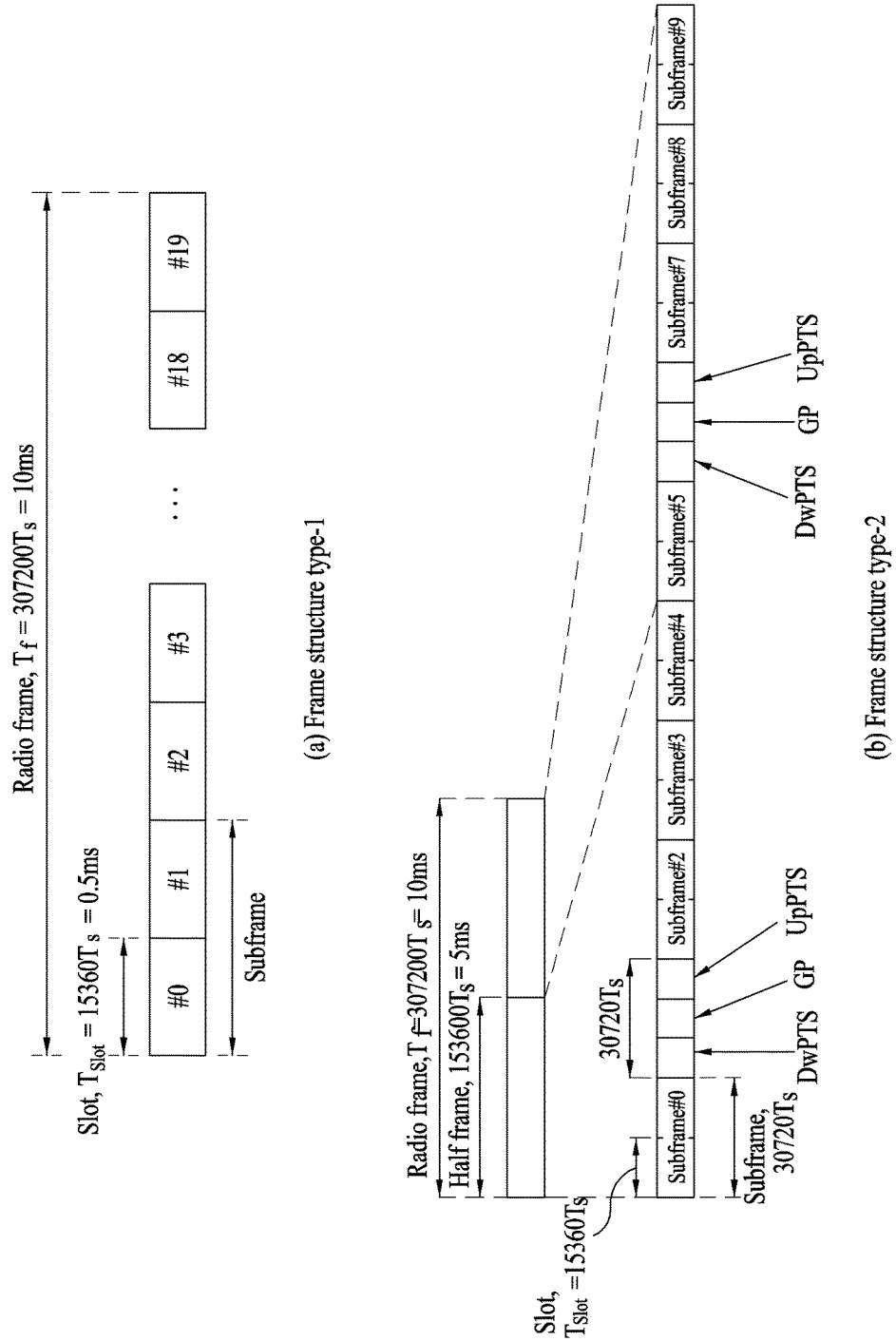
FIG. 2 illustrates a radio frame structure used in LTE-(A)

FIG. 2 illustrates a radio frame structure used in LTE(-A). 3GPP LTE supports a type-1 radio frame structure for FDD (Frequency Division Duplex) and a type-2 radio frame structure for TDD (Time Division Duplex).

FIG. 2($a$) illustrates a structure of a type-1 radio frame. An FDD radio frame is composed of downlink subframes (SFs) only or uplink subframes only. The radio frame includes 10 subframes each of which is composed of 2 slots in the time domain. A subframe is 1 ms in length and a slot is 0.5 ms in length. The slot includes a plurality of OFDM symbols (downlink) or SC-FDMA symbols (uplink) in the time domain. An OFDM symbol or an SC-FDMA symbol can be simply referred to as a symbol (referred to as sym hereinafter) in the specification unless otherwise mentioned.

FIG. 2($b$) illustrates a type-2 radio frame structure. The type-2 radio frame includes 2 half frames. Each half frame includes 4(5) normal subframes and 1(0) special subframe. A normal subframe is used on uplink or downlink according to uplink-downlink (UL-DL) configuration. The special subframe includes DwPTS (downlink pilot timeslot), GP (guard period), and UpPTS (uplink pilot timeslot). DwPTS is used for initial cell search, synchronization or channel estimation of a UE. UpPTS is used for channel estimation of a BS and uplink transmission synchronization of a UE. The GP is a period for cancelling interference generated on uplink due to multi-path delay of a downlink signal between uplink and downlink. A subframe includes 2 slots.

Table 1 shows subframe configurations in a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Here, D denotes a downlink subframe, U denotes an uplink subframe and S denotes a special subframe.

Figure 3:
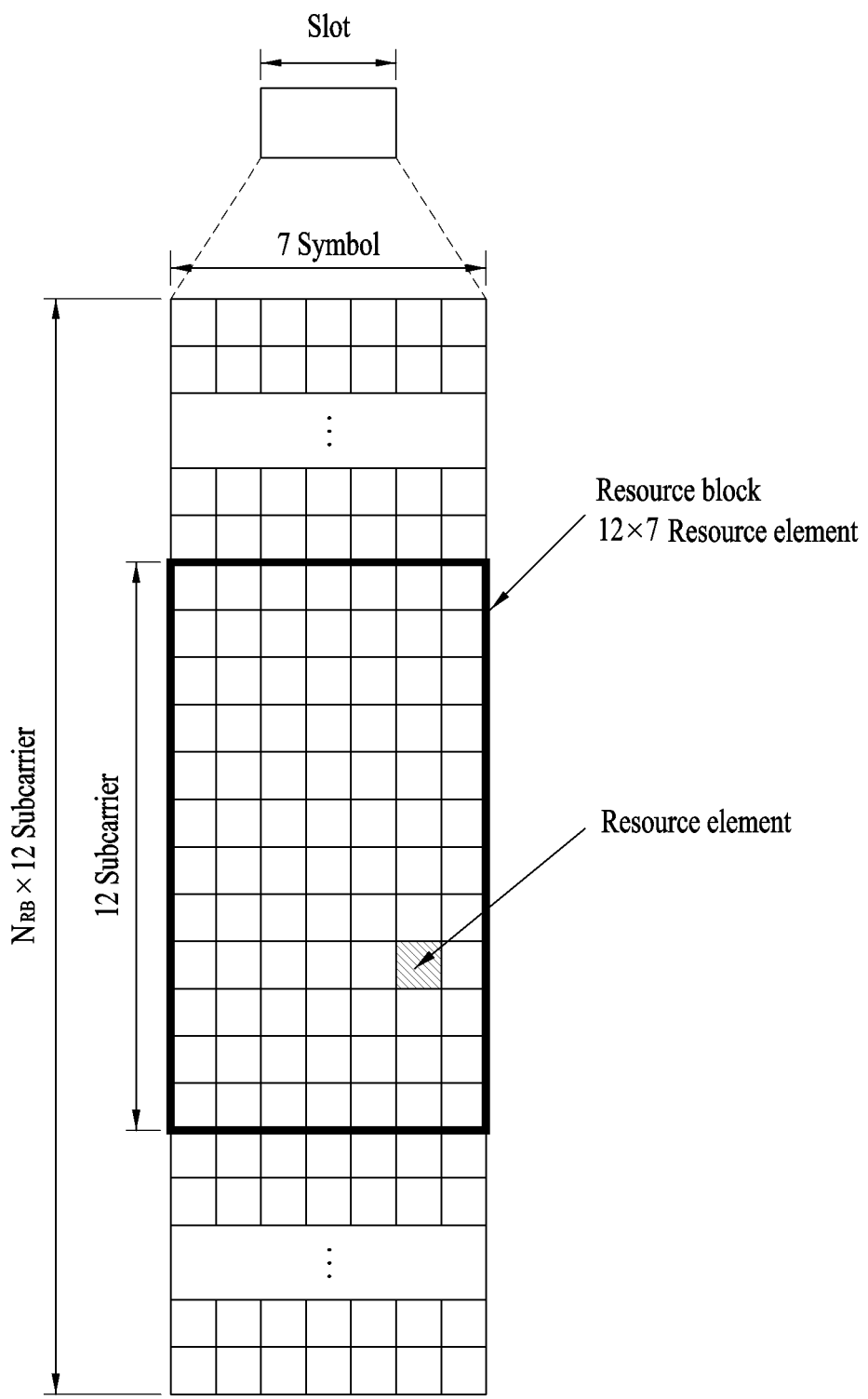
FIG. 3 illustrates a resource grid of a downlink slot.

FIG. 3 illustrates a resource grid in a slot. The slot includes a plurality of (e.g. 7 or 6) symbols (e.g. OFDM symbols or SC-FDMA symbols) in the time domain. The slot includes a plurality of source blocks (RBs) in the frequency domain. An RB includes 12 subcarriers. Each element in the resource grid is referred to as a resource element (RE). The RE is a minimum resource unit for signal transmission, and one modulation symbol is mapped to the RE.

Figure 4:
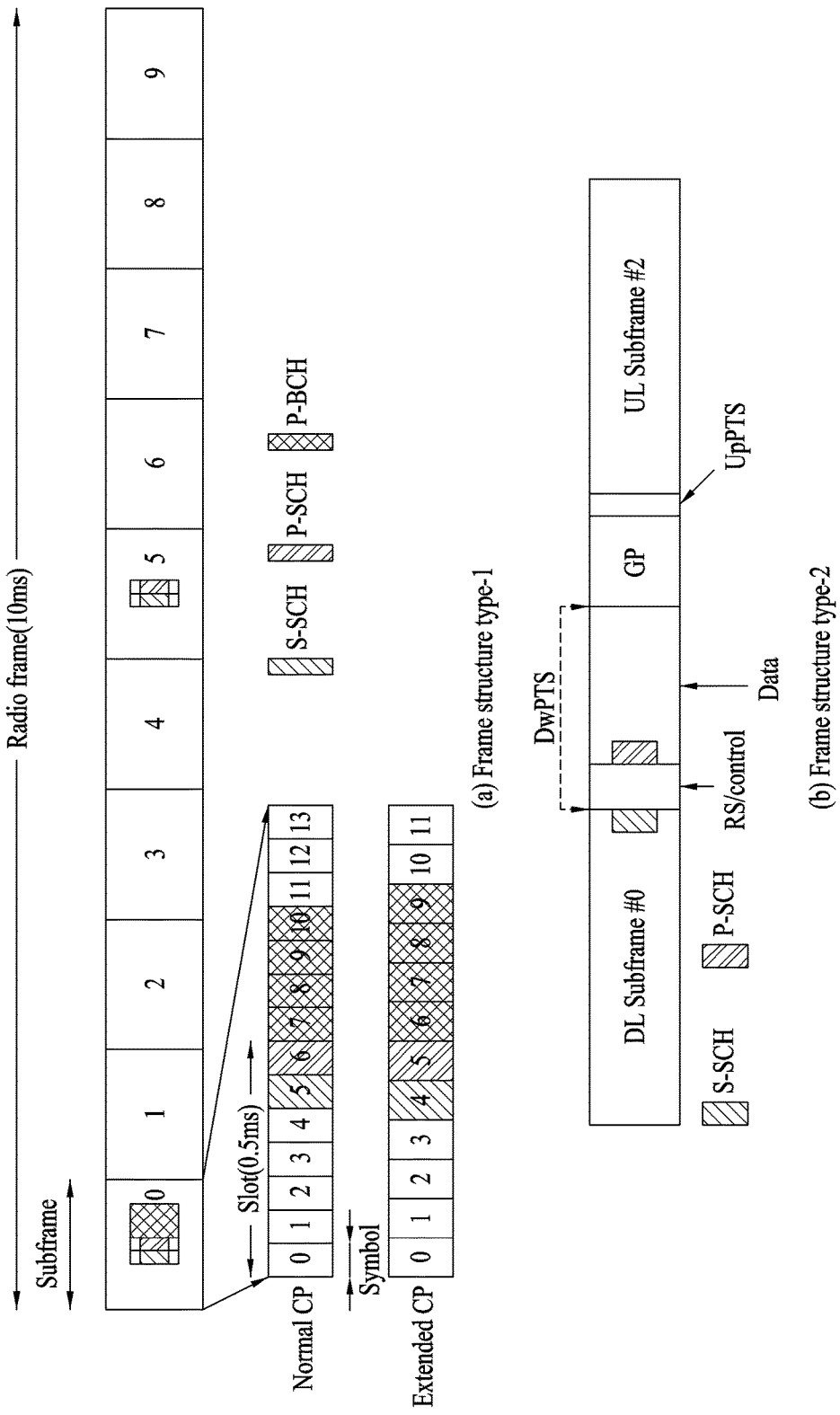
FIGS. 4 to 6 illustrate a physical broadcast channel (PBCH) and a synchronization channel (SCH) of an LTE system.
Figure 5:
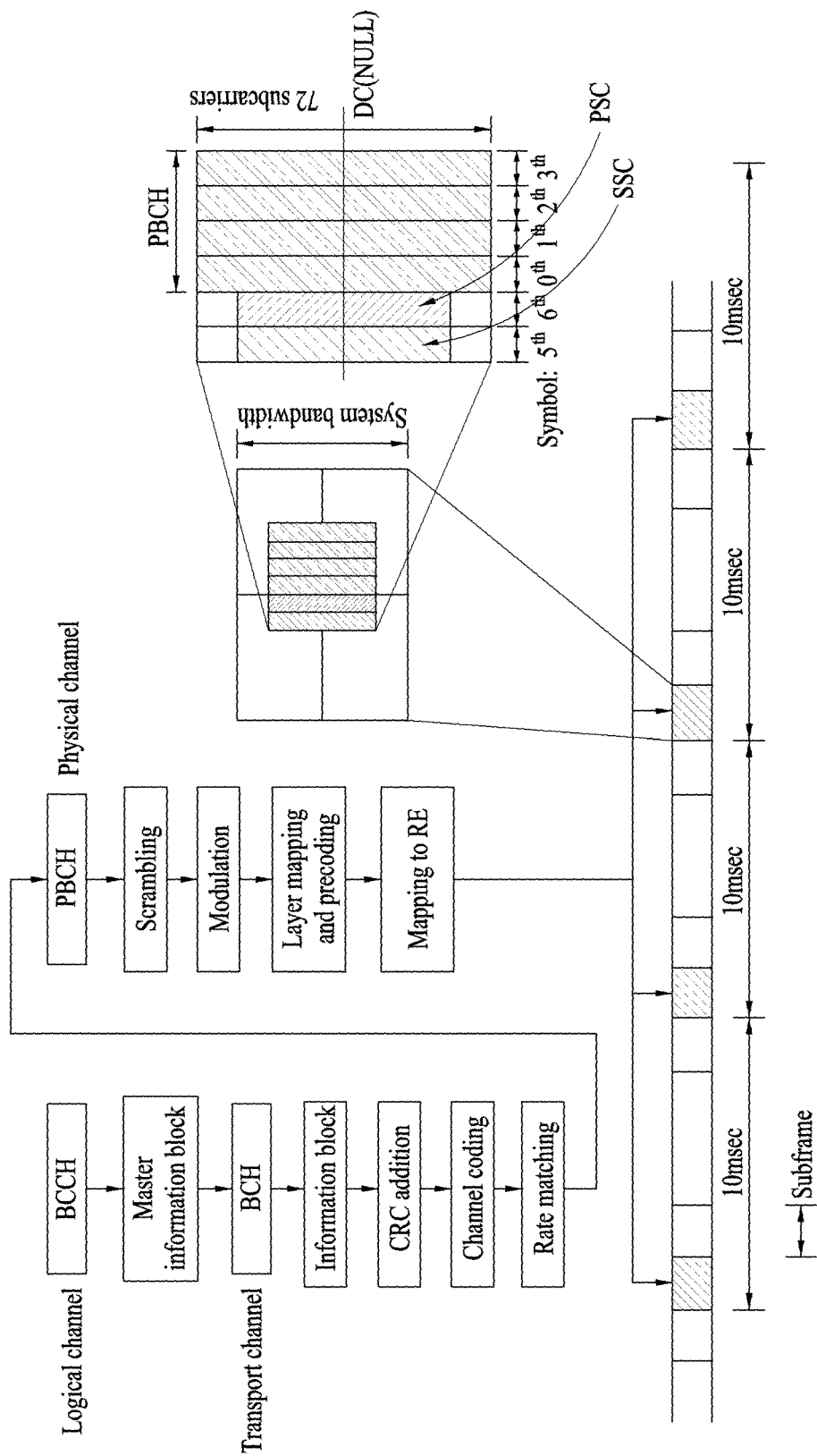
Figure 6:
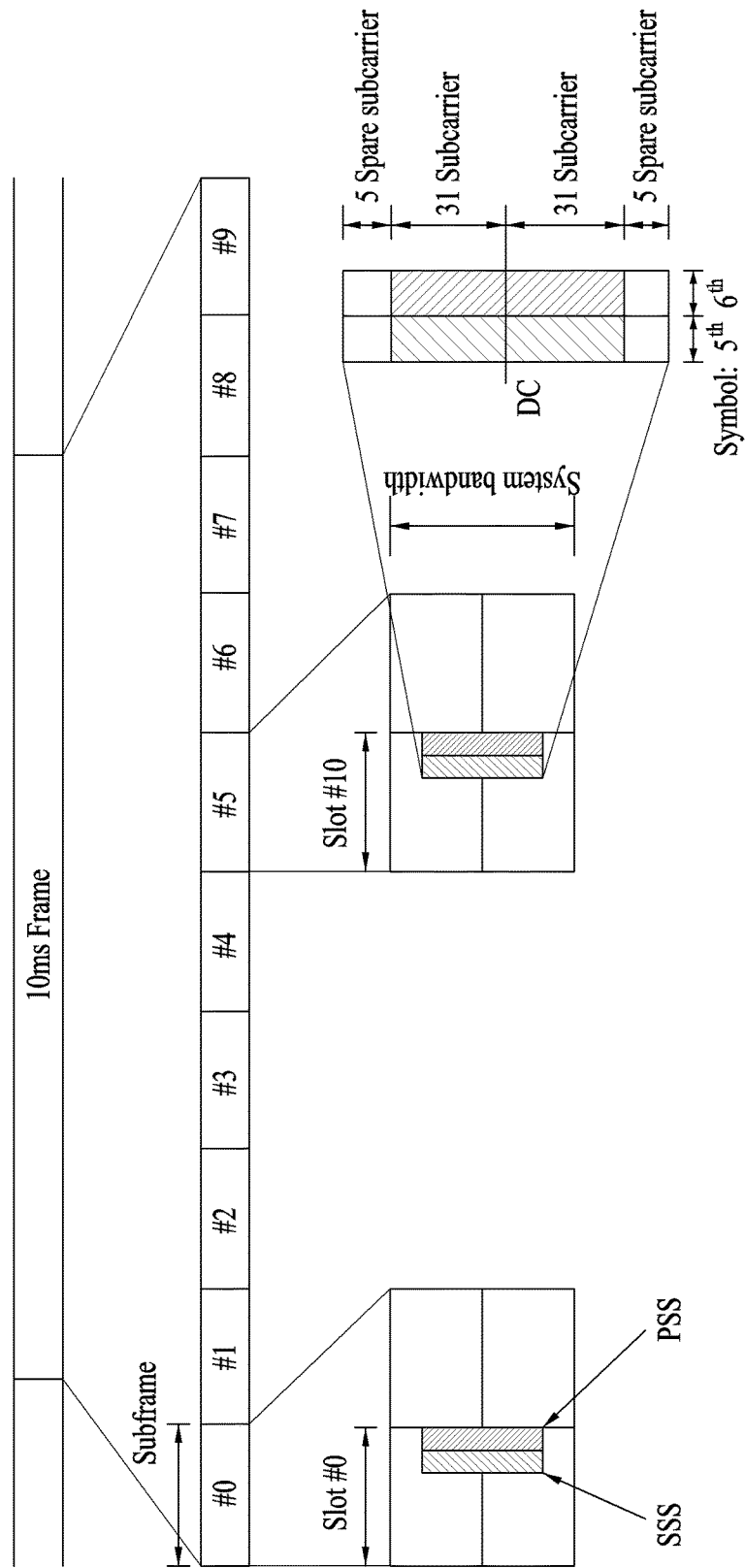

FIGS. 4 to 6 illustrate a physical broadcast channel (PBCH) and a synchronization channel (SCH) of an LTE system.

A PBCH is used to carry an MIB. The MIB includes minimum essential system information. Other system information is included in a system information block (SIB) which is transmitted over a PDSCH. Table 2 shows the contents of the MIB.

TABLE 2

```
-- ASN1START
MasterInformationBlock ::= SEQUENCE {
    dl-Bandwidth           ENUMERATED {
                             n6,n15,n25,n50,n75,n100,spare2,spare1},
    phich-Configuration    PHICH-Configuration,
    systemFrameNumber      BIT STRING (SIZE (8)),
    spare                  BIT STRING (SIZE (10)),
}
-- ASN1STOP
```

As shown in Table 2, the MIB includes a downlink bandwidth (DL BW), PHICH configuration information, a system frame number (SFN), 10 spare bits. Here, the SFN is an absolute value indicating a radio frame number and has a value in the range of 0 to 1023.

The MIB is scheduled at an interval of 40 ms and repeatedly transmitted four times in 40 ms. The i-th MIB transmission is scheduled in subframe #0 of a radio frame which satisfies SFN mod 4=i (i=0, 1, 2, 3). That is, a new MIB is transmitted in the first subframe (e.g. subframe #0) of a radio frame which satisfies SFN mod 4=0 every 40 ms and the same MIB is repeatedly transmitted three times at an interval of 10 ms. In this case, while actual SFNs corresponding to frames in which the MIB is transmitted in 40 ms are 4n, 4n+1, 4n+2 and 4n+3, the value of the SFN filed in the MIB is not changed. The SFN field in the MIB indicates 8 most significant bits (MSBs) of the actual SFN value and 2 least significant bits (LSBs) of the actual SFN value are determined within 40 ms according to MIB order. That is, first to fourth MIBs respectively indicate LSB=00, 01, 10, 11 in 40 ms. 40 ms timing is blind detected and explicit signaling for the 40 ms timing is not present.

The MIB is mapped to a physical resource after passing through channel coding, rate matching, cell-specific scrambling, modulation, layer mapping and precoding. In LTE (_A), the MIB is modulated according to QPSK (Quadrature Phase Shift Keying). A PBCH is mapped to a resource element (k, 1) indicated by Equation 1 in the first subframe of a radio frame.

$$k = \frac{N_{RB}^{DL} N_{sc}^{RB}}{2} - 36 + k',$$ [Equation 1]

$$k' = 0, 1, \ldots, 71$$

$$l = 0, 1, \ldots, 3$$

In Equation 1, l indicates an OFDM symbol index in the second slot (e.g. slot #1) in a subframe and k indicates a subcarrier index. Here, REs reserved for CRSs are excluded in a PBCH mapping process, and an eNB performs the PBCH mapping process on the assumption that all CRSs for antenna ports 0 to 3 are present, irrespective of the actual antenna configuration thereof. In this case, a UE can perform a PDSCH reception process on the assumption that REs, which are not used for CRS transmission while being assumed to be reserved for CRSs in the PBCH mapping process, are not available for PDSCH transmission.

An SCH includes a P-SCH (Primary SCH) and an S-SCH (Secondary SCH). In frame structure type-1 (i.e., FDD), the P-SCH is located in the last OFDM symbols of slot #0 (i.e. the first slot of subframe #0) and slot #10 (i.e. the first slot of subframe #5) in each radio frame. The S-SCH is located in OFDM symbols immediately before the last OFDM symbols of slot #0 and slot #10. The S-SCH and P-SCH are disposed in neighboring OFDM symbols. In frame structure type-2 (i.e., TDD), the P-SCH is transmitted through the third OFDM symbols of subframe #1/#6 and the S-SCH is disposed in the last OFDM symbols of slot #1 (i.e., the second slot of subframe #0) and slot #11 (i.e., the second slot of subframe #5). The P-SCH/S-SCH is transmitted using 6 RBs on the basis of the center frequency in the OFDM symbols. 62 subcarriers from among 72 subframes constituting 6 RBs are used for P-SCH/S-SCH transmission and the remaining 10 subcarriers are left as spare subcarriers.

Figure 7:
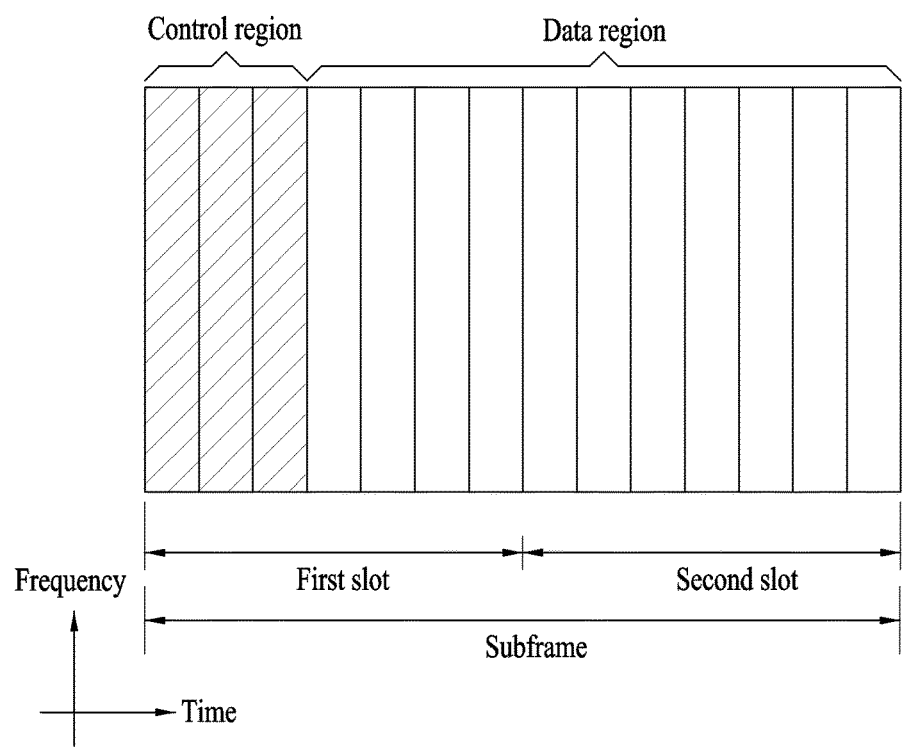
FIG. 7 illustrates a downlink subframe (SF) structure.

FIG. 7 illustrates a downlink subframe structure. A maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels include a physical control format indicator channel (PCFICH), a physical downlink control channel (PDCCH), a physical hybrid ARQ indicator channel (PHICH), etc.

A PCFICH is transmitted at a first OFDM symbol of a subframe and carries information (i.e., Control Format Indicator, CFI) regarding the number of OFDM symbols used for transmission of control channels within the subframe. The PCFICH is composed of 4 REGs which are equally distributed in the control region on the basis of cell ID. The PCFICH indicates values of 1 to 3 (or 2 to 4) and is modulated according to QPSK (Quadrature Phase Shift Keying). The PHICH is a response of uplink transmission and carries an HARQ acknowledgment (ACK)/negative-acknowledgment (NACK) signal. The PHICH is allocated to REGs except CRS and PCFICH (first OFDM symbol) in one or more OFDM symbols set based on PHICH duration. The PHICH is allocated to 3 REGs distributed in the frequency domain.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs.

The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. Control information transmitted through a PDCCH is referred to as DCI (Downlink Control Information). Formats 0, and 4 for uplink (hereinafter, UL grant) and formats 1, 1A, 1B, 1C, 1D, 2, 2A, 2B and 2C for downlink are (hereinafter, DL grant) defined as DCI formats. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary.

Figure 8:
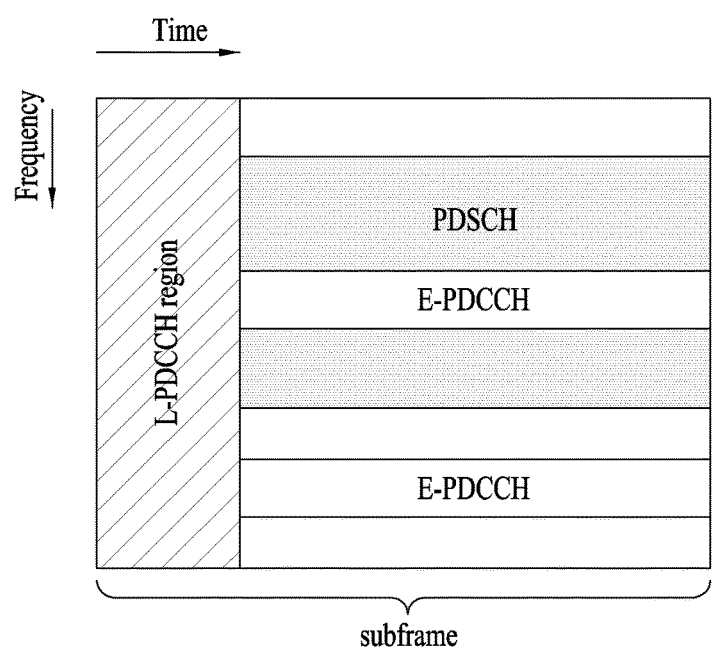
FIG. 8 illustrates an example of allocating an Enhanced PDCCH (E-PDCCH)

FIG. 8 illustrates an example of allocating an E-PDCCH to a subframe. In LTE, a PDCCH is transmitted through limited OFDM symbols. Accordingly, LTE-A introduced an enhanced PDCCH (E-PDCCH) for more flexible scheduling.

Figure 10:
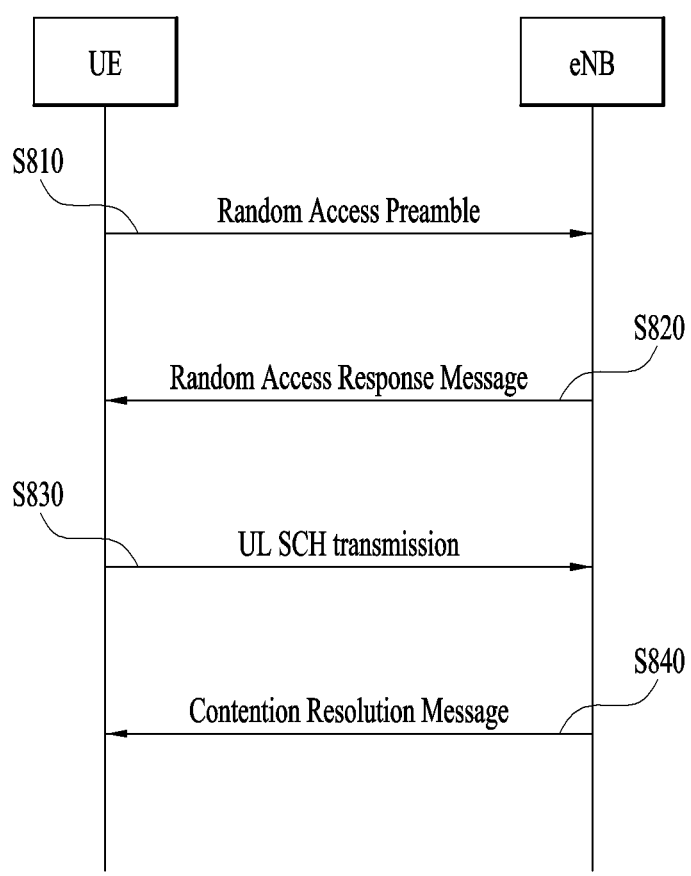
FIG. 10 illustrates a random access procedure.

Referring to FIG. 8, a PDCCH (legacy PDCCH, L-PDCCH) according to LTE(-A) can be allocated to a control region (refer to FIG. 7). An L-PDCCH region represents a region to which the legacy PDCCH can be assigned. The L-PDCCH region may refer to a control region, a control channel resource region (i.e. CCE resource) to which a PDCCH can be actually allocated in the control region or a PDCCH search space. A PDCCH can be additionally allocated to a data region (refer to FIG. 7). The PDCCH allocated to the data region is referred to as an E-PDCCH. As shown in FIG. 10, it is possible to mitigate scheduling restriction due to limited control channel resources of the L-PDCCH region by additionally securing control channel resources through the E-PDCCH. In the data region, an E-PDCCH and a PDSCH are multiplexed according to FDM (Frequency Division Multiplexing).

Specifically, the E-PDCCH can be detected/demodulated based on a DM-RS. The E-PDCCH may be transmitted over PRB pairs in the time domain. When E-PDCCH based scheduling is set, a subframe in which E-PDCCH transmission/detection is performed may be designated. The E-PDCCH can be configured in a USS only. A UE may attempt DCI detection only for L-PDCCH CSS and E-PDCCH USS in a subframe (referred to as an E-PDCCH subframe) in which E-PDCCH transmission/detection is set and attempt DCI detection for L-PDCCH CSS and L-PDCCH USS in a subframe (non-E-PDCCH subframe) in which E-PDCCH transmission/detection is not set.

Like the L-PDCCH, the E-PDCCH carries DCI. For example, the E-PDCCH can carry downlink scheduling information and uplink scheduling information. An E-PDCCH/PDSCH transmission/reception process and an E-PDCCH/PUSCH transmission/reception process are identical/similar to steps S107 and S108 of FIG. 4. That is, the UE can receive an E-PDCCH and receive data/control information through a PDSCH corresponding to the E-PDCCH. In addition, the UE can receive an E-PDCCH and transmit data/control information through a PUSCH corresponding to the E-PDCCH. LTE adopts a method of reserving a PDCCH candidate region (referred to as a PDCCH search space hereinafter) within a control region and transmitting a PDCCH of a specific UE in a part of the reserved PDCCH candidate region. Accordingly, the UE can acquire the PDCCH thereof within the PDCCH search space through blind detection. Similarly, an E-PDCCH can be transmitted through a whole reserved resource or part of the reserved resource.

Figure 9:
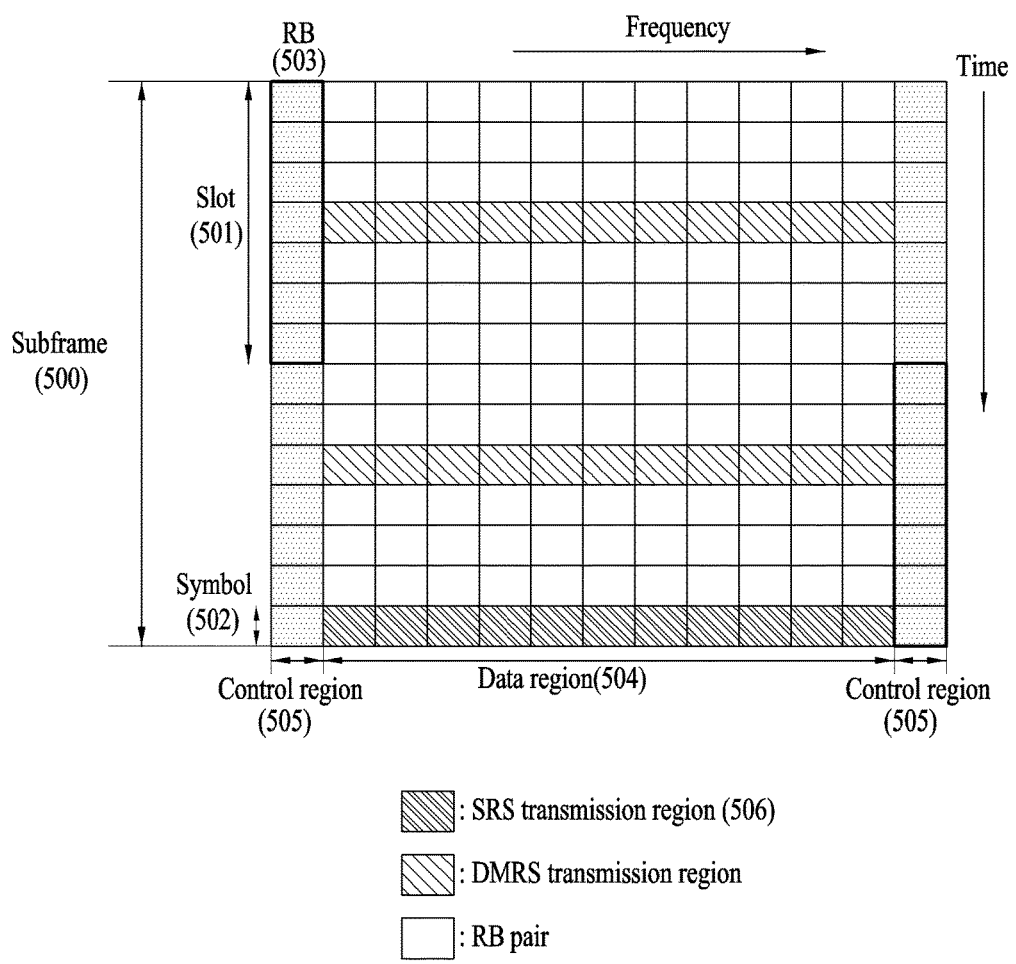
FIG. 9 illustrates an uplink subframe structure.

FIG. 9 illustrates an uplink subframe structure. A subframe 500 is composed of two 0.5 ms slots 501 each of which includes a plurality of SC-FDMA symbols. The subframe structure is divided into a data region 504 and a control region 505. The data region refers to communication resources used to transmit data such as audio data, packets and the like to each UE and includes a PUSCH (Physical Uplink Shared Channel). The control region refers to communication resources used to transmit uplink control signals, for example, a downlink channel quality report, reception ACK/NACK for a downlink signal, an uplink scheduling request and the like from each UE, and includes a PUCCH (Physical Uplink Control Channel). A sounding reference signal (SRS) is transmitted through the last SC-FDMA symbol of one subframe in the time domain. SRSs of multiple UEs, which are transmitted through the last SC-FDMA symbol of the same subframe, can be discriminated according to frequency position/sequence. An SRS may be periodically transmitted or aperiodically transmitted at the request of an eNB.

FIG. 10 illustrates a random access procedure. The random access procedure is used to transmit short-length data in uplink. For example, the random access procedure is performed upon initial access in an RRC idle mode, upon initial access after radio link failure, upon handover requiring the random access procedure, and upon the occurrence of uplink/downlink data requiring the random access procedure during an RRC connected mode. The random access procedure is divided into a contention-based procedure and a non-contention-based procedure.

Referring to FIG. 10, a UE receives information about random access from an eNB through system information and stores the received information. The UE transmits a random access preamble (message 1 (Msg1)) to the eNB through a PRACH when random access is needed (S810). Upon reception of the random access preamble from the UE, the eNB transmits a random access response message (message 2 (Msg2)) to the UE (S820). Specifically, downlink scheduling information about the random access response message is CRC-masked with a random access-RNTI (RA-RNTI) and transmitted through a PDCCH. Upon reception of the downlink scheduling signal masked with the RA-RNTI, the UE can receive the random access response message from a PDSCH. Then, the UE checks whether the random access response message includes a random access response (RAR) destined for the UE. The RAR includes timing advance (TA), uplink resource allocation information (UL grant), UE temporary identifier and the like. The UE transmits a UL-SCH (Shared Channel) message (message 3 (Msg3)) to the eNB according to the UL grant (S830). The eNB receives the UL-SCH message and then transmits a contention resolution message (message 4 (Msg4)) to the UE (S840).

Figure 11:
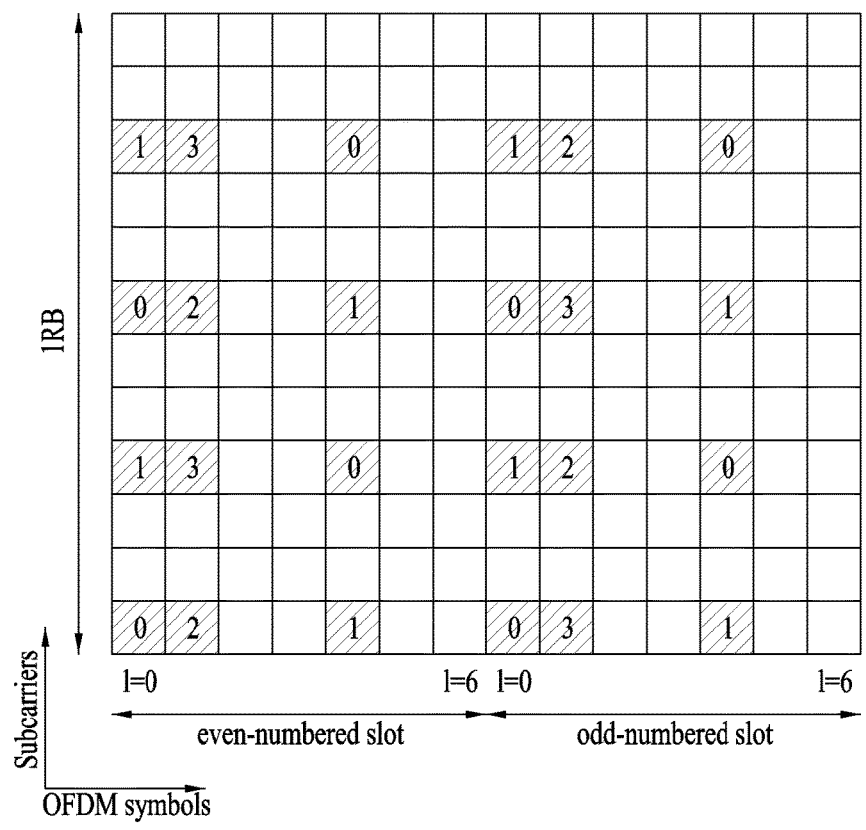
FIG. 11 illustrates a cell-specific reference signal (CRS)

FIG. 11 illustrates a cell-specific reference signal (CRS). CRSs are transmitted through antenna ports 0 to 3. One antenna (P=0), two antennas (P=0 and 1) or four antennas (P=0, 1, 2 and 3) can be supported according to eNB. FIG. 6 illustrates a CRS structure when up to four antennas are supported. Since the CRS is used for both demodulation and measurement in LTE, the CRS is transmitted over the entire bands in all downlink subframes supporting PDSCH transmission and transmitted through all antenna ports configured for an eNB. The CRS has high RS overhead since the CRS is transmitted over the entire band of each subframe.

To solve this problem, LTE-A additionally defines a UE-specific RS (UE-RS) and a CSI-RS. The UE-RS is used for demodulation and the CSI-RS is used to obtain channel state information. The UE-RS can be regarded as a demodulation reference signal (DRS). The UE-RS is transmitted only in RBs to which a PDSCH is mapped in a subframe in which the PDSCH is scheduled. The CSI-RS is a downlink RS introduced for channel measurement. LTE-A defines a plurality of CSI-RS configurations for CSI-RS transmission.

The CSI-RS is transmitted at a predetermined transmission interval. A CSI-RS transmission subframe (referred to as a CSI-RS subframe hereinafter) is determined by a CSI-RS transmission periodicity $T_{CSI-RS}$ and a CSI-RS subframe offset $\Delta_{CSI-RS}$. The CSI-RS transmission periodicity $T_{CSI-RS}$ and the CSI-RS subframe offset $\Delta_{CSI-RS}$ are given according to CSI-RS subframe configuration information $I_{CSI-RS}$, as shown in the following table.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

A CSI-RS subframe is set as a subframe which satisfies the following equation.

$$(10n_f + \lfloor n_s/2 \rfloor - \Delta_{CSI-RS}) \bmod T_{CSI-RS} = 0 \quad [\text{Equation 2}]$$

where $n_f$ indicates an SFN value of a radio frame and $n_s$ indicates a slot index.

In CSI-RS subframes, a CSI-RS sequence $r_{l,n_s}(m)$ is mapped to a complex modulation symbol $a_{k,l}^{(p)}$ used as a reference symbol for antenna port p according to the following equation.

$$a_{k,l}^{(p)} = w_{l''} \cdot r_{l,n_s}(m') \quad [\text{Equation 3}]$$

Here, $w_{l''}$, k and l are provided according to the following equation.

[Equation 4]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Here, (k', l') are given according to Tables 8 and 9. Table 8 shows a normal CP case and Table 9 shows an extended CP case. Tables 8 and 9 show positions of slots and REs occupied by CSI-RSs of antenna ports in an RB pair according to CSI-RS configuration and the number of configured CSI-RSs (i.e., the number of configured CSI-RS ports).

TABLE 4

| | | Number of CSI reference signals configured | | | | | |
|---|---|---|---|---|---|---|---|
| | | 1 or 2 | | 4 | | 8 | |
| CSI reference signal configuration | | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |

TABLE 4-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| FS2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

FS1: Frame structure type 1 (FDD).
FS2: Frame structure type 2 (TDD).

TABLE 5

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| FS1 and FS2 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| FS2 only 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Figure 12:
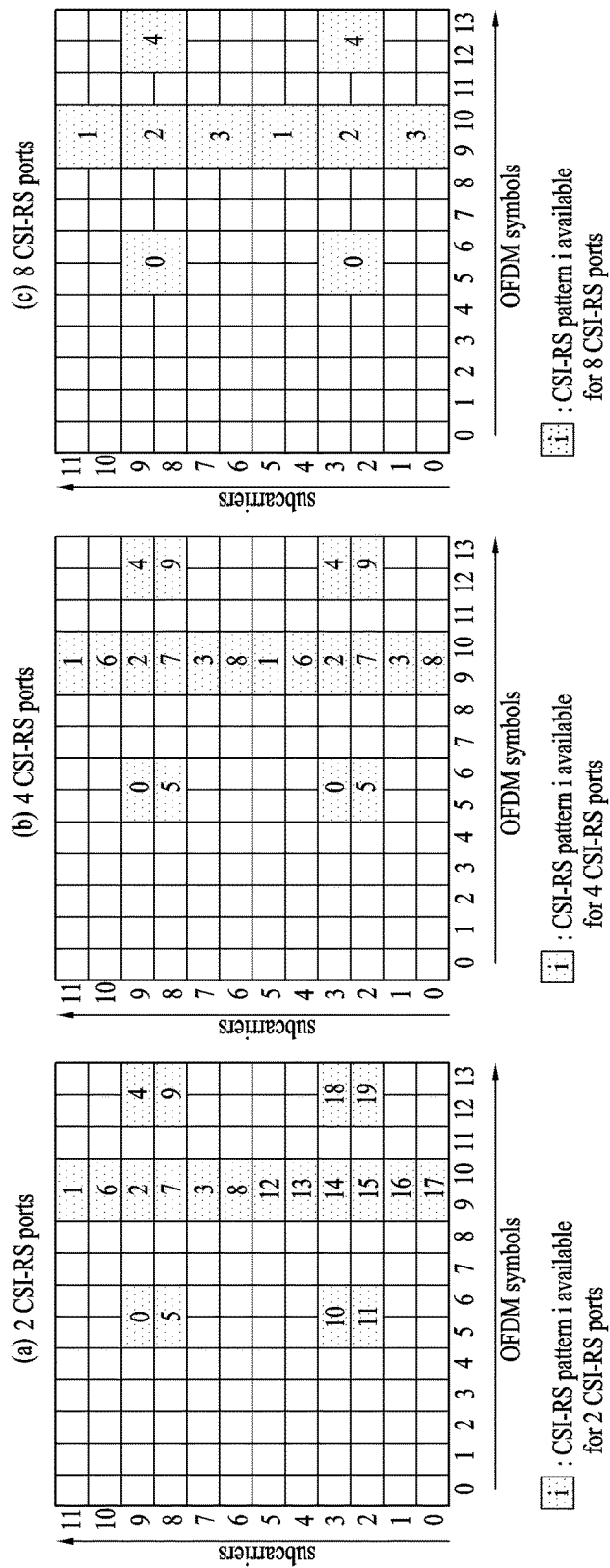
FIG. 12 illustrates channel state information reference signal (CSI-RS) configurations.

FIG. 12 illustrates channel state information reference signal (CSI-RS) configurations. FIG. 12(a) shows 20 CSI-RS configurations 0 to 19 available for CSI-RS transmission using two CSI-RS ports, from among the CSI-RS configurations of Table 4, FIG. 12(b) shows 10 CSI-RS configurations 0 to 9 available for CSI-RS transmission using four CSI-RS ports, from among the CSI-RS configurations of Table 4, and FIG. 12(c) shows 5 CSI-RS configurations 0 to 4 available for CSI-RS transmission using eight CSI-RS ports, from among the CSI-RS configurations of Table 4. CSI-RS ports refer to antenna ports configured for CSI-RS transmission. For example, antenna ports 15 to 22 correspond to CSI-RS ports in Equation 4.

Figure 13:
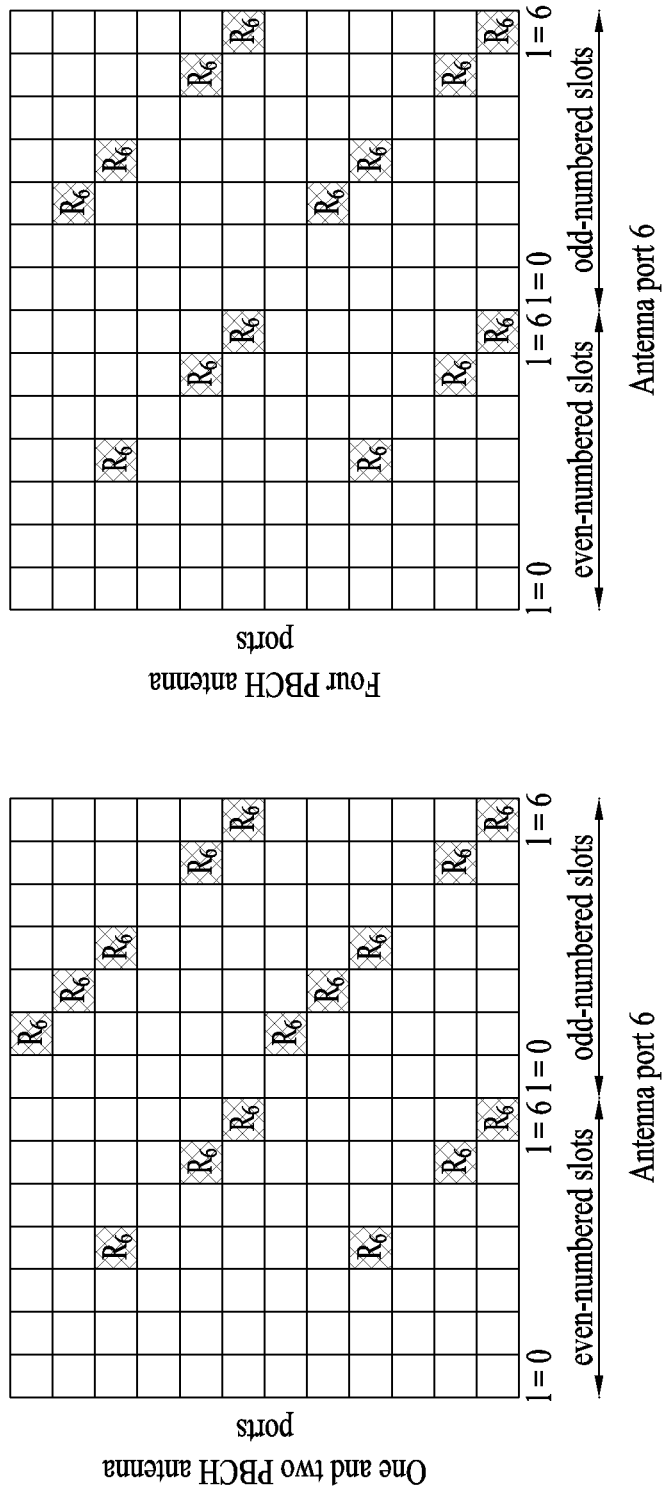
FIG. 13 illustrates channel state information reference signal (CSI-RS) configurations.

FIG. 13 illustrates a positioning reference signal (PRS). The PRS is a reference signal used to measure a UE position and is transmitted through antenna port 6. The PRS is transmitted in consecutive RBs in a downlink subframe in which PRS transmission is set, and a PRS transmission band is set by a higher layer (e.g., RRC). A PRS transmission subframe (referred to as a PRS subframe hereinafter) is periodically set by a higher layer (e.g., RRC). The PRS subframe is defined by a PRS configuration index $I_{PRS}$ as follows.

TABLE 6

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | | Reserved |

A PRS subframe is set as a subframe which satisfies the following equation.

$$(10n_f + \lfloor n_s/2 \rfloor - \Delta_{PRS}) \bmod T_{PRS} = 0 \quad \text{[Equation 5]}$$

wherein $n_f$ indicates an SFN value of a radio frame and $n_s$ indicates a slot index.

In PRS subframes, a PRS sequence $r_{l,n_s}(m)$ is mapped to a complex modulation symbol $a_{k,l}^{(p)}$ used as a reference symbol for antenna port p=6 according to the following equation.

$$a_{k,l}^{(p)} = r_{l,n_s}(m') \quad \text{[Equation 6]}$$

Here, k, l and m' are given according to the following equation.
[Equation 7]
Normal Cyclic Prefix:

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 PBCHantenna ports)} \\ 2, 3, 5, 6 & \text{if } n_s \bmod 2 = 1 \text{ and (4 PBCHantenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

Extended Cyclic Prefix:

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and (1 or 2 PBCHantenna ports)} \\ 2, 4, 5 & \text{if } n_s \bmod 2 = 1 \text{ and (4 PBCHantenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

Here, a PRS transmission band $N_{RB}^{PRS}$ is set by a higher layer, and $v_{shift} = N_{ID}^{cell} \bmod 6$. $N_{ID}^{cell}$ indicates a physical cell ID (i.e., eNB ID).

Embodiment: MTC (Machine Type Communication) Coverage Enhancement

Systems following LTE-A consider configuration of inexpensive/low-specification UEs which mainly perform data communication such as metering, water level measurement, utilization of monitoring cameras, vending machine inventory reporting and the like. Such UEs are called MTC (Machine Type Communication) UEs for convenience. Since MTC UEs have a small quantity of transmitted data and infrequently perform uplink/downlink data transmission/reception, it is efficient to reduce the UE price and battery power consumption according to low data transfer rate. In addition, such MTC UEs have characteristics that mobility is low and channel environments are hardly changed. Various coverage enhancement schemes per channel/signal are under discussion in consideration of situations in which MTC UEs are installed in coverage-limited places such as buildings, factories and basements. For example, methods for repeatedly transmitting a channel/signal for MTC coverage enhancement are under discussion.

As described above with reference to FIGS. 5 and 6, a new PBCH (i.e., a new MIB) is transmitted at an interval of 40 ms in LTE-A (e.g., Rel-10). The PBCH is repeated four times within 40 ms and transmitted through SF #0 of each radio frame. In a normal CP case, the PBCH is transmitted through OFDM symbols (referred to as sym hereinafter) #7, #8, #9 and #10 in SF #0 of each radio frame. A PSS/SSS is transmitted through sym #5 and #6 in SFs #0 and #5 in FDD and transmitted through sym #13 in SFs #0 and #5 and sym #2 in SFs #1 and #6 in TDD in a normal CP case. Accordingly, the PBCH and the PSS/SSS do not collide in SF #0, and thus repeated transmission of an additional PBCH in subframes other than SF #0 does not affect additional PSS/SSS transmission resources.

In addition, as described above with reference to FIGS. 11 and 12, a CRS is transmitted through sym #0, #1, #4, #7, #8 and #11 in each DL SF in a normal CP case in LTE-A and transmitted along with a PBCH in PBCH transmission symbols (i.e., sym #7, #8, #9 and #10 in SF #0) for PBCH demodulation. A CSI-RS is periodically transmitted through sym #5, #6, #9, #10, #12 and #13 in a normal CP case. The CSI-RS is not permitted to be transmitted in PBCH symbols irrespective of CSI-RS configuration for PBCH protection. Accordingly, when an additional PBCH is repeatedly transmitted through an SF other than SF #0 for PBCH coverage enhancement and symbols previously occupied by a PBCH in SF #0 are used in the other SF for repeated transmission of the additional PBCH, CSI-RS transmission resources and a degree of freedom of CSI-RS transmission resource configuration may be remarkably reduced/deteriorated due to additional PBCH transmission.

To solve this problem, the present invention proposes a method for repeatedly transmitting a PBCH in consideration of CSI-RS transmission resources and a degree of freedom of CSI-RS transmission resource configuration. Prior to description of the present invention, terms and abbreviation used in the present invention are described.

SF: subframe

Legacy channel/signal (referred to as L-channel/signal hereinafter): this refers to a channel/signal transmitted in LTE(-A). For example, the L-channel/signal includes an L-PBCH, an L-SIB and the like.

Additional channel/signal (referred to as A-channel/signal hereinafter): this refers to a channel/signal additionally transmitted for coverage enhancement of coverage-limited UEs. For example, a channel additionally transmitted for PBCH coverage enhancement can be referred to as an A-PBCH.

PBCH (bundle) duration: this refers to a duration (or all SFs constituting the duration) in which PBCHs having the same MIB (e.g., same SFN) are repeatedly transmitted. Since a PBCH is repeatedly transmitted at an interval of 40 ms in LTE(-A), the PBCH duration is set to 40 ms (or 40 SFs or 4 radio frames). For convenience, the PBCH (bundle) duration can be classified into an L-PBCH (bundle) duration and an A-PBCH (bundle) duration in the specification. The L-PBCH duration refers to a period in which only an L-PBCH is repeatedly transmitted and the A-PBCH duration refers to a period including A-PBCH transmission. The L-PBCH duration and the A-PBCH duration can be independently set. When the A-PBCH duration is set to be identical to the L-PBCH duration, the A-PBCH duration can include transmission of A-PBCHs only or transmission of A-PBCHs and L-PBCHs. When the A-PBCH duration and the L-PBCH duration are identical, since A-PBCHs and L-PBCHs transmit the same MIB (e.g., same SFN), the A-PBCHs and L-PBCHs can be combined in a PBCH detection/reception procedure. Conversely, when the A-PBCH duration is different from the L-PBCH duration, the A-PBCH duration includes transmission of A-PBCHs only. In the specification, the PBCH (bundle) duration may be interpreted as an SF set (or resources) in which a PBCH is transmitted.

PBCH bundle: this refers to a PBCH set repeated in the PBCH (bundle) duration. The PBCH bundle transmits the same MIB. For convenience, the PBCH bundle can be divided into an L-PBCH bundle and an A-PBCH bundle. The L-PBCH bundle may include 4 L-PBCHs and the A-PBCH bundle may include A-PBCHs only or include A-PBCHs and L-PBCHs.

(Bundle) duration: this refers to a period (or all SFs constituting the period) in which an A-channel/signal is repeatedly transmitted. In the specification, the (bundle) duration may be interpreted as an SF set in which an A-channel/signal is transmitted. The (bundle) duration may be regarded as a generalized representation including the PBCH (bundle) duration.

Bundle: this refers to a channel/signal set repeated in the (bundle) duration. The bundle may be regarded as a generalized representation including the PBCH bundle.

PBCH (transmission) SF: this refers to an SF in which a PBCH is transmitted or can be transmitted.

PBCH (transmission) symbol: this refers to a symbol through which a PBCH is transmitted or can be transmitted.

Normal PDSCH: this refers to a PDSCH carrying UE-specific data.

To examine A-PBCH transmission symbols, OFDM symbols used for signal/channel transmission in conventional LTE-A are described below (normal CP case). It is assumed that an A-PBCH cannot be transmitted through first three OFDM symbols (i.e., sym #0, #1 and #2) through which a PCFICH/PHICH/PDCCH can be transmitted.

1) L-PBCH transmission symbol: sym #7, #8, #9 and #10 in SF #0
2) PSS/SSS transmission symbol: sym #5 and #6 in SFs #0 and #5 (FDD), sym #13 in SFs #0 and #5, and sym #2 in SFs #1 and #6
(TDD)
3) CRS transmission symbol: sym #0, #1, #4, #7, #8 and #11 in all SFs
4) CSI-RS transmission symbol: sym #5, #6, #9, #10, #12 and #13 in configured SFs
5) Symbol not used for transmission of CSI-RS and PSS/SSS: sym #3, #4, #7, #8 and #11
6) Symbols not used for transmission of CRS PSS/SSS: sym #3, #12 and #13 (FDD), sym #3, #5, #6 and #12 (TDD) (sym #9 and #10 having a lot of CSI-RS transmission resources configurable therefor are excluded)

When an A-PBCH is repeatedly transmitted through an SF other than SF #0 for PBCH coverage enhancement, Alt 1 to Alt 4 can be considered. While Alt 1 to Alt 4 describe a normal CP case for convenience, Alt 1 to Alt 4 can be equally/identically applied to an extended CP case.

[Alt 1]
A PBCH can be transmitted through legacy PBCH symbols sym #7, #8, #9 and #10 in SF #0 and transmitted through all or part (e.g. four) of OFDM symbols sym #3, #4, #7, #8 and #11 (and/or sym #12 and #13 for FDD, sym #5, #6 and #12 for TDD) in other SFs. The four OFDM symbols can be designated as sym #3, #4, #7 and #8 or sym #7, #8, #11 and #12. Alternatively, the four OFDM symbols may be designated as sym #3, #7, #8 and #12 such that an A-PBCH and an L-PBCH occupy the same number of REs. Since only two CRS transmission symbols are included in sym #3, #7, #8 and #12, the A-PBCH and L-PBCH can occupy the same number of REs.

[Alt 2]
A PBCH can be transmitted through legacy PBCH symbols sym #7, #8, #9 and #10 in SF #0 and SF set 1 and transmitted according to Alt 1 in other SFs. SF set 1 refers to an SF set including SFs #5 and can be composed of SF #5 only. SF 5# includes PSS and/or SSS transmission.

[Alt 3]
A PBCH can be transmitted through legacy PBCH symbols sym #7, #8, #9 and #10 in SF #0 and SF set 1 and transmitted through all or part (e.g., four) of OFDM symbols sym #3, #4, #5, #6, #7 and #8 in other SFs. The four OFDM symbols may be designated as sym #3, #4, #5 and #6, sym #4, #5, #6 and #7 or sym #5, #6, #7 and #8. SF set 1 refers to an SF set including SF #5 and can be composed of SF #5 only. SF 5# includes PSS and/or SSS transmission. In this case, while configurable CSI-RS transmission resources are partially limited, an A-PBCH can be transmitted/received through consecutive OFDM symbols while maintaining the same number of REs as an L-PBCH.

[Alt 4]
A PBCH can be transmitted through legacy PBCH symbols sym #7, #8, #9 and #10 in SF #0, transmitted according to Alt 1 in SF set 1 and transmitted according to Alt 3 in other SFs. SF set 1 refers to an SF set including SF #5 and can be composed of SF #5 only. SF 5# includes PSS and/or SSS transmission.

When Alt 1 to Alt 4 are generalized, A-PBCH transmission symbols (or REs) can be configured only using symbols which are not permitted for CSI-RS transmission (except symbols through which legacy control channels and synchronization signals can be transmitted) or configured by combining all symbols (or REs) which are not permitted for CSI-RS transmission and part (e.g., symbols in which relatively fewer configurable CSI-RS transmission REs are distributed) of symbols (or REs) available for CSI-RS transmission.

In the case of an SF (e.g., SF #0/#5) in which a single PBCH is transmitted using legacy PBCH symbols sym #7, #8, #9 and #10 (while including PSS and/or SSS transmission) (in a normal CP case) in Alt 1 to Alt 4, all or part (e.g., four) of sym #3, #4, #11 and #12 (and/or sym #13 for FDD and sym #5 and #6 for TDD) can be additionally used for additional PBCH transmission (which is referred to as Method 1 hereinafter). Similarly, in the case of an SF (e.g., SF #0/#5) including PSS and/or SSS transmission in an extended CP case, a single PBCH can be transmitted using legacy PBCH symbols sym #6, #7, #8 and #9 and an additional PBCH can be transmitted using sym #2, #3, #10 and #11 for FDD and sym #2, #3, #4 and #5 or sym #3, #4, #5 and #10 for TDD (which is referred to as Method 2 hereinafter).

When Method 1 and Method 2 are applied, exemplary combinations of symbols to/in which A-PBCHs are mapped/transmitted are as follows.

(1) Method 1 (Normal CP)
A. FDD case
i. A-PBCH #1 in SF #0, A-PBCH #2 in SF #5: sym #3/4/11/12 (or sym #4/11/12/13) [sym #3/4/11/12 is advantageous in terms of FDD/TDD commonality and sym #4/11/12/13 is advantageous in terms of securing a PDCCH region]
ii. A-PBCH #3 in SF #5: sym #7/8/9/10
B. TDD case
i. A-PBCH #1 in SF #0, A-PBCH #2 in SF #5: sym #3/4/11/12 (or #5/6/11/12 or #3/4/5/6) [sym #3/4/11/12 advantageous in terms of FDD/TDD commonality, sym #5/6/11/12 is advantageous in terms of securing a PDCCH region and sym #3/4/5/6 is advantageous in terms of PBCH signal mapping]

ii. A-PBCH #3 in SF #5: sym #7/8/9/10

(2) Method 2 (Extended CP)

A. FDD case i. A-PBCH #1 in SF #0, A-PBCH #2 in SF #5: sym #2/3/10/11 ii. A-PBCH #3 in SF #5: sym #6/7/8/9

B. TDD case i. A-PBCH #1 in SF #0, A-PBCH #2 in SF #5: sym #2/3/4/5 (or #3/4/5/10) [sym #2/3/4/5 is advantageous in terms of CSI-RS configurability and sym #3/4/5/10 is advantageous in terms of securing a PDCCH region]

ii. A-PBCH #3 in SF #5: sym #6/7/8/9

As described above, when a normal CP is set, symbols available for PBCH repetition are sufficient and thus the same combination of symbols to/in which A-PBCHs are mapped/transmitted can be determined/set in FDD and TDD. When an extended CP is set, a combination of symbols to/in which A-PBCHs are mapped/transmitted can depend on a duplex scheme (FDD or TDD) since symbols available for PBCH repetition may be insufficient. In addition, for the same reason, the number and/or combinations of SFs to/in which A-PBCHs are mapped/transmitted may depend on CP length (e.g., normal CP or extended CP). For example, the number of SFs used for A-PBCH transmission in an A-PBCH duration in a normal CP case can be greater than that in an extended CP case.

When an A-PBCH is transmitted through an SF (e.g. SF #0/#5) in which a legacy PBCH and/or PSS/SSS are transmitted, an SF (e.g. SF #4/#9) in which a paging signal can be transmitted or an SF (e.g. SF #0/#4/#5/#9) which cannot be configured as a multicast broadcast single frequency network (MBSFN) SF, A-PBCH reception/detection operation can be performed on the assumption that the CP length of the A-PBCH corresponds to a CP length (or CP length of SF #0) detected from a PSS/SSS. Here, a CP length can be given as a normal CP or an extended CP (or time corresponding thereto). An A-PBCH can be transmitted through an SF set (e.g. SF #1/#2/#3/#6/#7/#8) which can be configured as MBSFN SFs. For convenience, an SF set configurable as MBSFN SFs is referred to as an MBSFN candidate set. An MBSFN SF is set through higher layer (e.g. RRC) signaling from an MBSFN candidate set. First N (e.g. 1 or 2) OFDMN symbols in the MBSFN SF are used as a control region and other OFDM symbols are used as a region (MBSFN region) for multicast channel (MCH) transmission. In the MBSFN SF, symbols in the control region use the same CP as a non-MBSFN SF and symbols in the MBSFN region use an extended CP. Accordingly, a CP length of an SF in the MBSFN candidate set can depend on MBSFN configuration. However, since a UE cannot be aware of MBSFN configuration information (e.g. a bitmap) in an initial access stage, it is necessary to predefine a CP length that needs to be assumed/applied by the UE for A-PBCH reception/detection.

To solve this problem, the following solutions can be considered. Sol-1) An eNB can transmit a PBCH using an extended CP in an MBSFN candidate set. Accordingly, the UE can perform A-PBCH reception/detection by assuming/applying the extended CP in the MBSFN candidate set. Sol-2) The eNB can transmit a PBCH using a CP length detected from a PSS/SSS (or identical to that in SF #0) in the MBSFN candidate set. Accordingly, the UE can perform A-PBCH reception/detection by assuming/applying the CP length (or CP length of SF #0) detected from the PSS/SSS in the MBSFN candidate set. When repeated transmission is applied to a specific channel/signal (e.g. SIB, paging, RAR or Msg4) and/or a normal PDSCH/EPDCCH, Sol-1 and Sol-2 can be applied. Otherwise, Sol-3) a method of UE-commonly signaling information about a CP length used for/applied to each SF or MBSFN candidate set through a PBCH, an SIB or an additional broadcast signal/channel (transmitted with predetermined periodicity) can be additionally considered.

Alternatively, the UE apply Sol-1 or Sol-2 to all channels/signals (including a normal PDSCH/EPDCCH) transmitted/scheduled prior to reception of MBSFN configuration information (and/or signaling of Sol-3). In the case of channels/signals transmitted/scheduled after reception of MBSFN configuration information, the UE can apply Sol-1 or Sol-2 to a specific channel/signal (e.g. PBCH, SIB, paging, RAR or Msg4) and apply Sol-1 or Sol-2 to other channels/signals (e.g. normal PDSCH and/or EPDCCH) or determine a CP length to be assumed/applied per SF according to MBSFN configuration (and/or Sol-3 based CP length configuration).

When OFDM symbols including all or a specific part of configurable CSI-RS REs (i.e., REs configurable for CSI-RS transmission; referred to as possible CSI-RS REs hereinafter) and A-PBCH transmission symbols overlap, the following options can be considered. Opt 1) To secure a number of PBCH REs, an A-PBCH signal can be mapped/transmitted to/in possible CSI-RS REs. In this case, the UE can operate on the assumption that CSI-RS transmission/configuration is not present in a PBCH bundle duration. For example, the UE can perform an A-PBCH demodulation/decoding procedure on the assumption that A-PBCHs are mapped/transmitted to/in possible CSI-RS REs in the PBCH bundle duration. In addition, the UE can skip a CSI-RS based channel measurement procedure in the PBCH bundle duration. Opt 2) To secure CSI-RS transmission resources and a degree of freedom of CSI-RS transmission resource configuration, an A-PBCH signal may not be mapped/transmitted to/in possible CSI-RS REs. To this end, the eNB can rate-match or puncture the A-PBCH signal in consideration of possible CSI-RS REs. In this case, the UE can perform A-PBCH reception/detection operation (e.g. demodulation and decoding) on the assumption that no A-PBCH is transmitted in possible CSI-RSs in the PBCH bundle duration. Opt 3) Opt 1 can be applied to A-PBCH transmission in a specific SF and Opt 2 can be applied to A-PBCH transmission in other SFs (non-specific SFs, for convenience). Here, the specific SF includes an SF (e.g. SF #5) in which a PSS/SSS is transmitted and/or an SF (e.g. SF #4 and/or SF #9) in which a paging signal can be transmitted. Opt 1, Opt 2 and Opt 3 can be similarly applied to specific channels/signals repeatedly transmitted after a PBCH. The specific channels/signals repeatedly transmitted after a PBCH may include a (specific) SIB, a paging signal, a PDSCH (i.e. RAR) including a response to PRACH preamble transmission, a PDSCH (i.e. Msg4) transmitted for contention resolution with respect to PUSCH (i.e. Msg3) transmission scheduled from an RAR, a normal PDSCH, an EPDCCH and the like.

Alternatively, the UE can receive/detect a PBCH bundle signal on the assumption that CSI-RS transmission/configuration is not present in a PBCH bundle duration (all subframes and/or resources which constitute or can constitute the PBCH bundle period) prior to reception of CSI-RS configuration information. After the CSI-RS configuration information is received, the UE can operate as follows (when resources (i.e. REs) through which a CSI-RS is transmitted and resources which constitute or can constitute a PBCH bundle overlap). Method 1) The UE can receive/detect the PBCH bundle signal on the assumption that (actual) CSI-RS transmission/configuration is not present in all resources which constitute or can constitute the PBCH bundle. Method 2) The UE can receive/detect the PBCH bundle signal only in resources other than resources (i.e. REs) through which a CSI-RS is actually transmitted from among the resources which constitute (or can constitute) the PBCH bundle. Method 3) The UE can operate on the assumption that the PBCH bundle signal is not configured/transmitted in a subframe in which the CSI-RS is actually transmitted from among the resources which constitute (or can constitute) the PBCH bundle. In other words, the UE can operate on the assumption that the PBCH bundle signal is configured/transmitted only through a subframe in which the CSI-RS is not actually transmitted from among the resources which constitute (or can constitute) the PBCH bundle. When the UE fails to receive/detect the PBCH bundle signal in Methods 1 and 2, the UE can use the CSI-RS, which is received/detected on the assumption that the CSI-RS is actually transmitted, for the original purpose (e.g. CSI measurement). When the UE has successfully received/detected the PBCH bundle signal, the UE does not use the CSI-RS which is received/detected on the assumption that the CSI-RS is not actually transmitted in the case of Method 1 or the UE can use the CSI-RS, which is received/detected on the assumption that the CSI-RS is actually transmitted, for the original purpose in the case of Method 2. The aforementioned methods can be applied to repeated transmission of a specific UE-common data/signal (e.g. SIB, paging signal and/or RAR).

Alternatively, in the case of channels/signals repeatedly transmitted after a PBCH, Opt 1, 2 and 3 are applied to a channel/signal (including a normal PDSCH/EPDCCH) transmitted/scheduled before the UE receives CSI-RS configuration information, whereas the following method may be considered for a channel/signal transmitted/scheduled after the UE receives the CSI-RS configuration information. That is, Opt 1, 2 and 3 are applied to a specific channel/signal (e.g., PBCH, SIB, paging signal, RAR or Msg4), whereas Opt 1, 2 and 3 are applied to other channels/signals (e.g., normal PDSCH and/or EPDCCH) or rate matching or puncturing is performed on the other channels/signals according to actual CSI-RS configuration.

Alternatively, a specific channel/signal (e.g. PBCH, SIB, paging, RAR or Msg4) and/or a bundle (SFs constituting the bundle) in which a normal PDSCH/EPDCCH is transmitted can be composed of a specific SF only. The specific SF may correspond to all or part of an SF which cannot be configured as an MBSFN SF, an SF (e.g. SF #0/#5) in which a PSS/SSS is transmitted and an SF (e.g. SF #4/#9) in which a paging signal can be transmitted. Opt 1 may be applied for rate matching in consideration of a CSI-RS in the corresponding bundle.

A coverage enhancement level necessary per MTC UE may depend on MTC UE deployment and/or channel state. In addition, a coverage gain required for an MTC UE in a worst condition, for example, a path-loss value, or coverage (e.g. SNR or SINR) enhancement requirement (referred to as a worst coverage gain) calculated on the basis of the coverage gain may depend on environment and/or time.

When the worst coverage gain is relatively low, it may be effective to repeatedly transmit an A-PBCH only through a specific SF in an L-PBCH bundle duration (40 ms) to reduce system overhead. When an A-PBCH is additionally transmitted in the L-PBCH bundle duration (that is, when an A-PBCH duration and an L-PBCH duration are identical), an L-PBCH and an A-PBCH have the same SFN value in the A-PBCH duration and thus the L-PBCH and the A-PBCH can be combined in a PBCH reception/detection procedure. Accordingly, it is possible to consider SF priority for A-PBCH transmission and repeated transmission of the A-PBCH according to worst coverage gain. For example, it is assumed that the SF priority is SF #a>SF #b>SF #c, the worst coverage gain G has levels of G1<G2<G3 and G1, G2 and G3 respectively require repeated transmission of 1, 2 and 3 A-PBCHs. In this case, A-PBCHs can be transmitted through SF #a when the worst coverage gain is G1, SF #a/#b when the worst coverage gain is G2 and SF #a/#b/#c when the worst coverage gain is G3. In addition, it is possible to provide SF/symbol-set priority for A-PBCH transmission and to perform repeated A-PBCH transmission according to worst coverage gain. For example, it is assumed that the SF/symbol-set priority is symbol-set #1 (in SF #a)>symbol-set #2 (in SF #a)>symbol-set #3 (in SF #b)>symbol-set #4 (in SF #b), the worst coverage gain G has levels of G1<G2<G3<G4 and G1, G2, G3 and G4 respectively require repeated transmission of 1, 2, 3 and 4 A-PBCHs. In this case, A-PBCHs can be transmitted through symbol-set #1 (in SF #a) when the worst coverage gain is G1, symbol-sets #1 and #2 (in SF #a) when the worst coverage gain is G2, symbol-sets #1 and #2 (in SF #a) and symbol-set #3 (in SF #b) when the worst coverage gain is G3, and symbol-sets #1 and #2 (in SF #a) and symbol-sets #3 and #4 (in SF #b) when the worst coverage gain is G4.

When the worst coverage gain is high, an A-PBCH bundle (including the same SFN) may be transmitted over a plurality of L-PBCH durations. In this case, a single A-PBCH bundle can be transmitted through SFs belonging to different L-PBCH durations. An A-PBCH bundle duration may be determined/set to an integer multiple (e.g., 1, 2, . . . ) of an L-PBCH duration. An L-PBCH bundle having the same SFN as the A-PBCH bundle may be transmitted through a specific L-PBCH duration (e.g. first or last L-PBCH period) from among a plurality of L-PBCH durations. For commonality between FDD and TDD (particularly, UL-DL configuration #0), SFs through which the A-PBCH bundle is transmitted can be composed of SF #0 and SF #5 only. In this case, Method 1 (normal CP) and Method 2 (extended CP) may be used in order to determine A-PBCH transmission symbols.

An A-PBCH repetition number Np (and PBCH bundle configuration SF information corresponding thereto) and an SIB repetition number Ns (and SIB bundle configuration SF information corresponding thereto) may be defined/designated per worst coverage gain level G. Alternatively, the SIB repetition number Ns (and SIB bundle configuration SF information corresponding thereto) may be defined/designated per PBCH repetition number Np (and PBCH bundle configuration SF information corresponding thereto). Accordingly, the UE can perform blind decoding on a PBCH bundle corresponding to each worst coverage gain level G or each PBCH repetition number Np in order to detect the worst coverage gain (or A-PBCH repetition number) supported by the cell to which the UE is linked. Upon detection of G or Np through blind decoding, the UE can perform SIB reception operation on the assumption that repeated SIB transmission is performed according to an SIB repetition number Ns (and SIB bundle configuration SF information corresponding thereto) corresponding to G or Np.

SIBs transmitted in an SIB repetition/bundle duration (and/or SI-RNTI based PDCCHs scheduling the same) need to have the same information/content/payload. Accordingly, the UE can operate on the assumption that the information/content/payload included in SIBs transmitted in an SIB repetition/bundle duration (and/or SI-RNTI based PDCCHs scheduling the same) is not changed. That is, the UE can operate on the assumption that SIBs transmitted in an SIB repetition/bundle duration include the same information/content/payload. For example, the UE can perform reception combining for an SIB signal repeatedly transmitted through an SF set constituting an SIB repetition/bundle duration (and/or SI-RNTI based PDCCHs scheduling the same). When a legacy SIB transmission (and/or changeable) period (e.g. 80 ms, 80 TTIs, 80 SFs or 8 radio frames) is defined as a legacy SIB duration (L-SIB duration), a single A-SIB repetition/bundle period can be determined/set to an integer multiple (e.g. 1, 2, . . . ) of an L-SIB duration.

Repeated A-PBCH transmission may be preferentially performed in a specific SF having a relatively low degree of freedom of flexible use/configuration (e.g. an SF (e.g. SF #5) through which a PSS/SSS is transmitted, an SF (e.g. SF #4/#9) through which a paging signal can be transmitted or an SF (e.g. SF #4/#5/#9) which cannot be configured as an MBSFN SF). For example, when a worst coverage gain requires three repeated A-PBCH transmissions, an A-PBCH bundle can be transmitted through SFs #4, #5 and #9. When the worst coverage gain requires four repeated A-PBCH transmissions (in a PBCH duration or one radio frame), the A-PBCH bundle can be transmitted through SFs #4, #5 and #9 and one of other SFs. Alternatively, repeated A-PBCH transmission may be preferentially performed in SFs other than the specific SF. For example, when the worst coverage gain requires six repeated A-PBCH transmissions (in a PBCH duration or one radio frame), the A-PBCH bundle can be transmitted through SFs #1, #2, #3, #6, #7 and #8. When the worst coverage gain requires seven repeated A-PBCH transmissions, the A-PBCH bundle can be transmitted through SFs #1, #2, #3, #6, #7 and #8 and one of other SFs.

According to the aforementioned principle, it is possible to configure a PBCH bundle using only SFs which cannot be configured as MBSFN SFs or using all SFs which cannot be configured as MBSFN SFs or specific part of SFs which can be configured as MBSFM SFs.

The aforementioned method may be applied to a case in which a PBCH is repeatedly transmitted in NCT (New Carrier Type). The NCT refers to a carrier which does not provide backward compatibility for LTE-A and includes a carrier through which a non-configurable (i.e. fixed) common RS is transmitted through only some DL SF. In this case, Alt 1 or Alt 3 (specifically, the method applied to SFs other than SFs using legacy PBCH symbols sym #7, #8, #9 and #10) can be applied to PBCH transmission through SF #0.

Assuming a situation in which a PBCH bundle is continuously transmitted or transmitted discontinuously but frequently at a short interval, when A-PBCHs (except L-PBCH) constituting the PBCH bundle are transmitted using only the same SF number and/or symbol index in all radio frames in an L-PBCH duration, it may be impossible or uneasy to use the corresponding SF number/symbol index (i.e. SF number/symbol index of an SF/symbol through which the A-PBCHs are transmitted) for other purposes (e.g. DL data scheduling/transmission and/or CSI-RS transmission configuration). Taking this into account, it is possible to consider a method for configuring/transmitting A-PBCHs using different SF number combinations and/or different symbol index combinations for respective radio frames or radio frame sets in the L-PBCH. When radio frames in an L-PBCH duration (i.e. 40 ms or 4 radio frames) are defined as radio frames #0/#1/#2/#3 in chronological order, radio frame set 1 can be composed of even-numbered radio frames #0/#2 (or radio frames #0/#1 in the front part) and radio frame set 2 can be composed of odd-numbered radio frames #1/#3 (or radio frames #2/#3 in the rear part). Radio frames in a radio frame set can use the same SF number combination and/or the same symbol index combination.

Specifically, assuming radio frame sets (simply sets) 1 and 2, A-PBCHs may be configured/transmitted in SF #N in set 1 and SF #M in set 2 (N≠M); A-PBCHs may be configured/transmitted in both SF #N and SF #M in set 1 and A-PBCHs may be configured/transmitted only in SF #M in set 2; or A-PBCHs may be configured/transmitted in SF #N in set 1 only and A-PBCHs may not be configured/transmitted in set 2. SF/symbol combinations occupied by A-PBCHs, which belong to the same set, may be identical and SF/symbol combinations occupied by A-PBCHs, which belong to different sets, may be identical or different. Alternatively, A-PBCHs may be configured/transmitted using symbol index combination A in set 1 and symbol index combination B in set 2. As to the numbers of symbols and/or indices constituting combination A and combination B, 1) the numbers of symbols may be identical and index combinations may be different or 2) both the numbers of symbols and the index combinations may be different. SF sets through which A-PBCHs are transmitted, which belong to the same set, may be identical, whereas SF sets through which A-PBCHs are transmitted, which belong to different sets, may be identical or different.

Transmission of an A-PBCH/A-SIB bundle and an L-PBCH/L-SIB according to TDM can be considered. In this case, the UE may acquire cell/system information through blind detection/decoding of the A-PBCH/A-SIB bundle after PSS/SSS detection and then successfully perform cell/system initial access through a random access procedure on the basis of the cell/system information. However, the UE may not be aware of information about time/period in which the A-PBCH/A-SIB bundle is transmitted and/or time in which the A-PBCH/A-SIB bundle continues only through the initial access procedure. Accordingly, to detect A-PBCH/A-SIB bundle-related information, the UE may need to intentionally perform blind detection/decoding again after initial access. This may be undesirable in terms of power consumption and complexity increase in the UE.

To solve the aforementioned problem, the eNB may inform the UE of A-PBCH/A-SIB bundle transmission related information (e.g. A-PBCH/A-SIB repetition number in the bundle and/or information about SFs constituting the bundle) and/or A-PBCH/A-SIB bundle configuration related information (e.g. time in which the bundle continues, time/period in which the bundle is transmitted and/or A-PBCH/A-SIB bundle interval). In addition, the eNB may inform the UE of information about a time when the UE will detect/receive an (updated) A-PBCH/A-SIB (bundle) and a time for which the UE can skip detection/reception of the A-PBCH/A-SIB (bundle) (since the A-PBCH/A-SIB (bundle) has not been updated). Such information can be signaled UE-commonly or UE-specifically through a broadcast signal (e.g., SIB or RRC signaling) or a specific unicast signal (e.g., RRC or MAC signaling).

When the UE does not detect/receive repetition information (e.g. A-PBCH repetition number, bundle constituting SFs, used symbol information and the like) applied to the A-PBCH bundle and/or bundle period information (e.g. time for which the bundle continues, bundle transmission time/period and the like) transmitted from the eNB, the UE may operate on the assumption that a PBCH bundle ("worst PBCH bundle" for convenience) having the largest repetition number and/or the smallest bundle period is transmitted until the actual PBCH bundle transmission information is acquired.

For example, when an EPDCCH/PDSCH (bundle) is transmitted in a worst PBCH duration, the UE can perform EPDCCH/PDSCH detection/reception operation on the assumption that the EPDCCH/PDSCH (bundle) can be configured/transmitted in SFs other than (all or a specific part of) SFs in which A-PBCHs can be transmitted in the worst PBCH bundle duration. That is, the UE can skip EPDCCH/PDSCH detection/reception operation in SFs in which A-PBCHs can be transmitted. As another example, when an EPDCCH/PDSCH (bundle) transmission resource and an RB region (referred to as a worst PBCH-RB region hereinafter) through which the worst PBCH bundle can be transmitted overlap, the UE can perform EPDCCH/PDSCH detection/reception operation on the assumption that the EPDCCH/PDSCH (bundle) is configured/transmitted in SFs other than (all or a specific part of) SFs in which A-PBCHs can be transmitted in the worst PBCH bundle duration. As another example, when the EPDCCH/PDSCH bundle transmission resource and the worst PBCH-RB region overlap, the UE can perform EPDCCH/PDSCH detection/reception operation on the assumption that the corresponding EPDCCH/PDSCH signal is configured/transmitted in (all or a specific part of) SFs in which A-PBCHs are transmitted, except the worst PBCH-RB region, in the worst PBCH bundle duration. In this case, the eNB may rate-match or puncture the EPDCCH/PDSCH signal in consideration of the overlapped worst PBCH-RB region. Accordingly, the UE can exclude the overlapped worst PBCH-RB region in the EPDCCH/PDSCH signal detection/reception procedure (e.g. demodulation and decoding). Alternatively, the UE can perform EPDCCH/PDSCH detection/reception operation on the assumption that the EPDCCH/PDSCH signal, except A-PBCH transmission symbols, is configured/transmitted in (all or a specific part of) SFs through which A-PBCHs can be transmitted in the worst PBCH bundle duration. In this case, the eNB may rate-match or puncture the EPDCCH/PDSCH signal in consideration of the A-PBCH transmission symbols. Accordingly, the UE can exclude the A-PBCH transmission symbols in the EPDCCH/PDSCH signal detection/reception procedure (e.g. demodulation and decoding).

Upon acquisition of the actual PBCH bundle transmission information, the UE can detect/receive the EPDCCH/PDSCH signal assuming/considering the actual PBCH bundle instead of the worst PBCH bundle. For example, the UE can perform EPDCCH/PDSCH detection/reception operation on the assumption that the EPDCCH/PDSCH (bundle) is configured/transmitted in SFs other than (all or a specific part of) SFs in which A-PBCHs are transmitted in the actual PBCH bundle duration. In addition, when the EPDCCH/PDSCH (bundle) transmission resource and an RB region (referred to as an actual PBCH-RB region hereinafter) through which the actual PBCH bundle can be transmitted overlap, the UE can perform EPDCCH/PDSCH detection/reception operation on the assumption that the EPDCCH/PDSCH bundle is configured/transmitted in SFs other than (all or a specific part of) SFs in which A-PBCHs are transmitted in the actual PBCH bundle duration. Furthermore, when the EPDCCH/PDSCH bundle transmission resource and the actual PBCH-RB region overlap, the UE can perform EPDCCH/PDSCH detection/reception operation on the assumption that the EPDCCH/PDSCH signal is configured/transmitted in (all or a specific part of) SFs in which A-PBCHs are transmitted, except the actual PBCH-RB region, in the actual PBCH bundle duration. In this case, the eNB may rate-match or puncture the EPDCCH/PDSCH signal in consideration of the overlapped actual PBCH-RB region. Accordingly, the UE can exclude the overlapped actual PBCH-RB region in the EPDCCH/PDSCH signal detection/reception procedure (e.g. demodulation and decoding). In addition, the UE can perform EPDCCH/PDSCH detection/reception operation on the assumption that the EPDCCH/PDSCH signal, except actual A-PBCH transmission symbols, is configured/transmitted in (all or a specific part of) SFs through which A-PBCHs can be transmitted in the actual PBCH bundle duration. In this case, the eNB may rate-match or puncture the EPDCCH/PDSCH signal in consideration of the actual A-PBCH transmission symbols. Accordingly, the UE can exclude the actual A-PBCH transmission symbols in the EPDCCH/PDSCH signal detection/reception procedure (e.g. demodulation and decoding).

In the case of a specific EPDCCH/PDSCH (bundle) signal (e.g. SIB, paging and/or RAR) (to which repeated transmission is applied), the UE can perform EPDCCH/PDSCH signal detection/reception operation on the assumption that A-PBCH transmission is not performed all the time irrespective of the actual PBCH bundle and transmission information about A-PBCHs corresponding to the actual PBCH bundle. That is, the UE can detect/receive the specific EPDCCH/PDSCH (bundle) signal assuming/considering only L-PBCH transmission, irrespective of actual A-PBCH configuration. Accordingly, when the specific EPDCCH/PDSCH (bundle) signal is allocated to an A-PBCH transmission SF, the UE can skip A-PBCH detection/reception operation in the corresponding SF.

Figure 14:
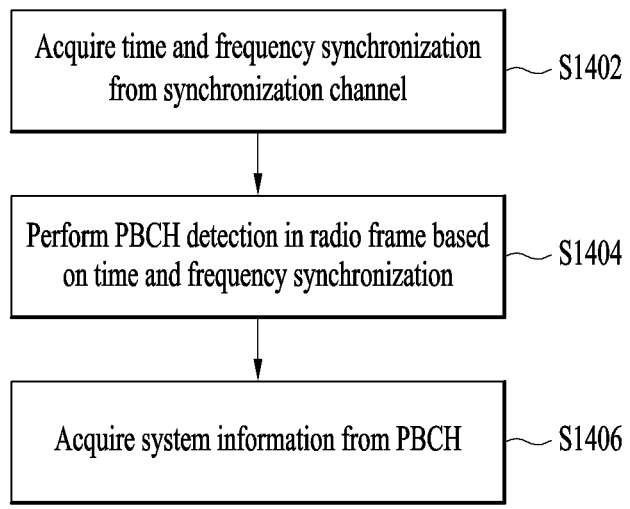
FIG. 14 illustrates a method for acquiring system information according to an embodiment of the present invention.

FIG. 14 illustrates a method for acquiring system information according to an embodiment of the present invention. Referring to FIG. 14, a UE may acquire time and frequency synchronization from a synchronization channel (S1402). Then, the UE may detect a PBCH in a radio frame on the basis of time and frequency synchronization (S1404) and acquire system information from a PBCH (S1406). When the UE is a non-MTC (Machine Type Communication) UE, PBCH detection may be performed in a single subframe in the radio frame (refer to FIGS. 5 and 6). When the UE is an MTC UE, PBCH detection may be performed in a plurality of subframes in the radio frame. Specifically, an A-PBCH may be additionally transmitted such that the MTC UE can perform PBCH detection in a plurality of subframes in the radio frame. A-PBCH transmission and signal processing according thereto may be performed using the aforementioned various methods. While FIG. 14 illustrates a case in which a plurality of PBCHs is transmitted in the radio frame for the MTC UE, the number of PBCHs transmitted in the radio frame is set to one and a method of transmitting a PBCH bundle (i.e. PBCHs having the same MIB) in a larger number of radio frames than that of LTE(-A) may be used. Refer to the aforementioned methods for details.

Figure 15:
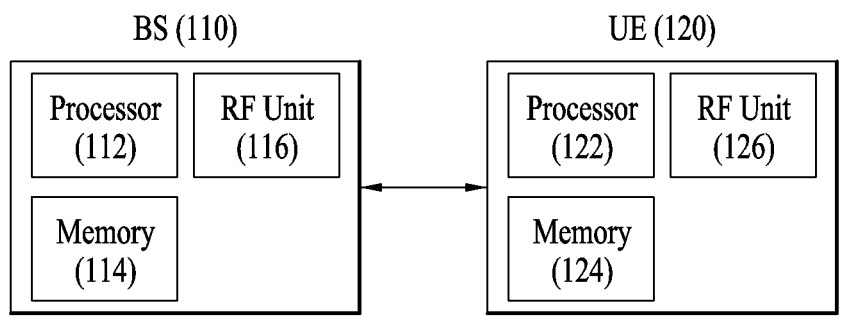
FIG. 15 is a diagram illustrating a base station and a user equipment, which can be applied to one embodiment of the present invention.

FIG. 15 is a diagram illustrating a base station and a user equipment, which can be applied to one embodiment of the present invention.

Referring to FIG. 15, a wireless communication system includes a base station (BS) 110 and a user equipment (UE) 120. In the downlink, the transmitter is a part of the base station 110, and the receiver is a part of the user equipment 120. In the uplink, the transmitter is a part of the user equipment 120, and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS), terminal and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a method and apparatus for performing communication when a plurality of carrier types is supported in a wireless communication system.

The invention claimed is:

1. A method for acquiring system information by a UE in a wireless communication system, comprising:
acquiring time and frequency synchronization from a synchronization channel;
performing a single PBCH (Physical Broadcast Channel) detection in a radio frame including 10 subframes on the basis of the time and frequency synchronization; and
acquiring the system information from the PBCH,
wherein the single PBCH detection is performed by using a PBCH signal only in a single subframe in the radio frame when the UE is a non-MTC (Machine Type Communication) UE, and
wherein the single PBCH detection is performed by combining a set of same PBCH signals on a plurality of subframes in the radio frame when the UE is an MTC UE, and the pattern of the plurality of subframes is varied per a set of radio frames.

2. The method according to claim 1, wherein the single PBCH detection is performed in subframe #0 in the radio frame when the UE is a non-MTC UE, and the single PBCH detection is performed in subframes #0 and #5 in the radio frame when the UE is an MTC UE.

3. The method according to claim 1, wherein the single PBCH detection is performed in [subframe #0, OFDMA (Orthogonal Frequency Division Multiple Access) symbols #7, #8, #9 and #10] in the radio frame when the UE is a non-MTC UE, and the single PBCH detection is performed in [subframe#0, O1-DMA symbols #7, #8, #9 and #10] and [subframe #5, OFDM symbols #3, #7, #8 and #12] in the radio frame when the UE is an MTC UE.

4. The method according to claim 1, wherein the single PBCH detection is performed in [subframe #0, OFDMA symbols #7, #8, #9 and #10] in the radio frame when the UE is a non-MTC UE, and the single PBCH detection is performed in [subframe#0, OFDMA symbols #3, #4, #11 and #12] and [subframe #5, OFDM symbols #3, #4, #11 and #12] in the radio frame when the UE is an MTC UE.

5. A UE used in a wireless communication system, comprising:
a radio frequency (RF) unit; and
a processor,
wherein the processor acquires time and frequency synchronization from a synchronization channel, to perform a single PBCH detection in a radio frame including 10 subframes on the basis of the time and frequency synchronization and to acquire the system information from the PBCH, wherein the single PBCH detection is performed by using a PBCH signal only in a single subframe in the radio frame when the UE is a non-MTC (Machine Type Communication) UE, and wherein the single PBCH detection is performed by combining a plurality of PBCH signals on in a plurality of subframes in the radio frame when the UE is an MTC UE, and the pattern of the plurality of subframes is varied per a set of radio frames.

6. The UE according to claim 5, wherein the single PBCH detection is performed in subframe #0 in the radio frame when the UE is a non-MTC UE, and the single PBCH detection is performed in subframes #0 and #5 in the radio frame when the UE is an MTC UE.

7. The UE according to claim 5, wherein the single PBCH detection is performed in [subframe #0, OFDMA symbols #7, #8, #9 and #10] in the radio frame when the UE is a non-MTC UE, and the single PBCH detection is performed in [subframe#0, OFDMA symbols #7, #8, #9 and #10] and [subframe #5, OFDM symbols #3, #7, #8 and #12] in the radio frame when the UE is an MTC UE.

8. The UE according to claim 5, wherein the single PBCH detection is performed in [subframe #0, OFDMA symbols #7, #8, #9 and #10] in the radio frame when the UE is a non-MTC UE, and the single PBCH detection is performed in [subframe#0, OFDMA symbols #3, #4, #11 and #12] and [subframe #5, OFDM symbols #3, #4, #11 and #12] in the radio frame when the UE is an MTC UE.

* * * * *